US011889234B2

(12) United States Patent
Silverstein et al.

(10) Patent No.: US 11,889,234 B2
(45) Date of Patent: Jan. 30, 2024

(54) LIGHT CONDITIONING OF DIRECT VIEW DISPLAY FOR CINEMA

(71) Applicant: IMAX Theatres International Limited, Dublin (IE)

(72) Inventors: Barry Silverstein, Rochester, NY (US); Steen Svendstorp Iversen, Dublin (IE); Steven Charles Read, Mississauga (CA); Denis Tremblay, Cambridge (CA); Anton Leonard Baljet, Oakville (CA); Jesse Donald McMullen-Crummey, Toronto (CA); Andrew F. Kurtz, Macedon, NY (US); John W. Bowron, Burlington (CA)

(73) Assignee: IMAX Theatres International Limited, Dublin (IE)

( * ) Notice: Subject to any disclaimer, the term of this patent is extended or adjusted under 35 U.S.C. 154(b) by 0 days.

(21) Appl. No.: 16/760,297

(22) PCT Filed: Nov. 14, 2018

(86) PCT No.: PCT/IB2018/058972
§ 371 (c)(1),
(2) Date: Apr. 29, 2020

(87) PCT Pub. No.: WO2019/097431
PCT Pub. Date: May 23, 2019

(65) Prior Publication Data
US 2021/0211618 A1   Jul. 8, 2021

Related U.S. Application Data

(60) Provisional application No. 62/585,869, filed on Nov. 14, 2017.

(51) Int. Cl.
*H04N 9/31* (2006.01)
*G03B 21/20* (2006.01)

(52) U.S. Cl.
CPC ....... *H04N 9/3152* (2013.01); *G03B 21/2033* (2013.01); *H04N 9/3164* (2013.01)

(58) Field of Classification Search
None
See application file for complete search history.

(56) References Cited

U.S. PATENT DOCUMENTS 4,792,850 A   12/1988   Liptoh et al.
4,957,361 A    9/1990   Shaw
(Continued)

FOREIGN PATENT DOCUMENTS

CN   1407407 A   4/2003
CN   1467561     1/2004
(Continued)

OTHER PUBLICATIONS

Liu et al., "A Novel BLU-Free Full-Color LED Projector using LED on Silicon Micro-Displays", IEEE, 2013, 4 pages.
(Continued)

*Primary Examiner* — John W Miller
*Assistant Examiner* — Sean N. Haiem
(74) *Attorney, Agent, or Firm* — Kilpatrick, Townsend, & Stockton LLP; Jason Gardner

(57) ABSTRACT

Systems for displaying images in a cinema setting can include components to reduce screen-door effect. The systems can include an array of light emitting sources (102) or other active sources of light. In one example, the light emitting source emit pixels of light to a projection lens (124) to project an image represented by the projection lens and a baffle (150) and an aperture stop (118) can block part of the light from the sources that exceeds an allowable cone angle of acceptable of the system. In another example, a display includes the array of light emitting sources and additional
(Continued)

elements, such as diffuser elements, positioned in front of the array of light emitting sources.

12 Claims, 27 Drawing Sheets

(56) References Cited

U.S. PATENT DOCUMENTS

| | | | |
|---|---|---|---|
| 5,658,490 A | 8/1997 | Sharp et al. | |
| 5,820,673 A | 10/1998 | Sentilles et al. | |
| 5,870,159 A | 2/1999 | Sharp | |
| 7,528,906 B2 | 5/2009 | Robinson et al. | |
| 7,633,666 B2 | 12/2009 | Lipton et al. | |
| 7,857,455 B2 | 12/2010 | Cowan et al. | |
| 8,023,052 B1 | 9/2011 | Osterman et al. | |
| 8,177,366 B2 | 5/2012 | Lee et al. | |
| 8,220,934 B2 | 7/2012 | Schuck et al. | |
| 8,403,488 B2 | 3/2013 | Schuck et al. | |
| 8,649,094 B2 | 2/2014 | Kurtz et al. | |
| 8,727,536 B2 | 5/2014 | Schuck et al. | |
| 8,830,580 B2 | 9/2014 | Kurtz et al. | |
| 2001/0013977 A1 | 8/2001 | Tadic-Galeb et al. | |
| 2002/0051642 A1 | 5/2002 | Hicks | |
| 2002/0131170 A1* | 9/2002 | Costales | H04N 13/214 359/464 |
| 2002/0167652 A1 | 11/2002 | Ueyama et al. | |
| 2003/0007105 A1 | 1/2003 | Magarill et al. | |
| 2003/0103194 A1 | 6/2003 | Gross et al. | |
| 2004/0071889 A1 | 4/2004 | Asakawa et al. | |
| 2005/0073659 A1 | 4/2005 | Sannohe | |
| 2005/0174775 A1* | 8/2005 | Conner | G02B 27/148 362/268 |
| 2007/0035852 A1* | 2/2007 | Farr | G02B 5/005 359/738 |
| 2007/0195417 A1 | 8/2007 | Yamamoto et al. | |
| 2007/0263179 A1* | 11/2007 | Katsuragawa | G03B 21/005 353/97 |
| 2009/0190095 A1* | 7/2009 | Ellinger | H04N 13/359 353/7 |
| 2009/0190101 A1 | 7/2009 | Alasaarela | G03B 33/12 353/81 |
| 2009/0278998 A1* | 11/2009 | El-Ghoroury | B82Y 20/00 257/E33.044 |
| 2010/0328609 A1* | 12/2010 | Silverstein | H04N 9/3155 353/7 |
| 2011/0019152 A1 | 1/2011 | Shestak et al. | |
| 2011/0176114 A1 | 7/2011 | Schuck, III et al. | |
| 2012/0038892 A1* | 2/2012 | Kurtz | H04N 9/3194 353/31 |
| 2012/0229430 A1 | 9/2012 | Ward et al. | |
| 2013/0107218 A1 | 5/2013 | Ebbesmeier et al. | |
| 2013/0107360 A1* | 5/2013 | Kurtz | G02B 1/00 359/434 |
| 2013/0235355 A1 | 9/2013 | Hirata et al. | |
| 2014/0118825 A1 | 5/2014 | Shikii et al. | |
| 2014/0253879 A1 | 9/2014 | Schuck et al. | |
| 2015/0138508 A1* | 5/2015 | Sharp | G03B 21/14 353/20 |
| 2016/0033757 A1* | 2/2016 | Kurtz | G02B 26/0833 359/292 |
| 2016/0150225 A1 | 5/2016 | Kurashige | |
| 2016/0373701 A1* | 12/2016 | Ferri | H04N 9/312 |
| 2017/0064269 A1* | 3/2017 | Schuck | H04N 13/363 |
| 2020/0162707 A1* | 5/2020 | Hu | H04N 9/3197 |
| 2021/0168352 A1* | 6/2021 | Silverstein | H04N 13/363 |

FOREIGN PATENT DOCUMENTS

| | | |
|---|---|---|
| CN | 101344713 | 1/2009 |
| CN | 101625512 | 1/2010 |
| CN | 101803392 A | 8/2010 |
| CN | 101878655 A | 11/2010 |
| CN | 101925855 | 12/2010 |
| CN | 102737563 | 10/2012 |
| CN | 102971659 | 3/2013 |
| CN | 103246002 | 8/2013 |
| CN | 104220920 | 12/2014 |
| CN | 105182672 | 12/2015 |
| CN | 105210361 | 12/2015 |
| CN | 105339836 A | 2/2016 |
| JP | 2004302478 | 10/2004 |
| JP | 2009116050 | 5/2009 |
| JP | 2017015927 | 1/2017 |
| WO | 2017130121 | 8/2017 |

OTHER PUBLICATIONS

International Patent Application No. PCT/IB2018/058972, International Search Report and Written Opinion, dated Apr. 26, 2019, 17 pages.

International Patent Application No. PCT/IB2018/058972, Partial Search Report, dated Mar. 1, 2019, 12 pages.

Chinese Patent Application No. 201880073326.3, Office Action dated Nov. 12, 2021, 12 pages (English machine translation submitted).

Application No. CN201880073326.3, Office Action, dated Jun. 17, 2022, 7 pages (2 Pages of English Translation; 5 Pages of Chinese Translation).

European Application No. EP 18811930.9, "Office Action," dated Dec. 12, 2022, 4 pages.

Chinese Patent Application No. 201880073326.3, Notice of Decision to Grant, dated Aug. 31, 2023, 4 pages.

Chinese Patent Application No. 201880073326.3, Rejection Decision dated Feb. 20, 2023, 12 pages.

\* cited by examiner

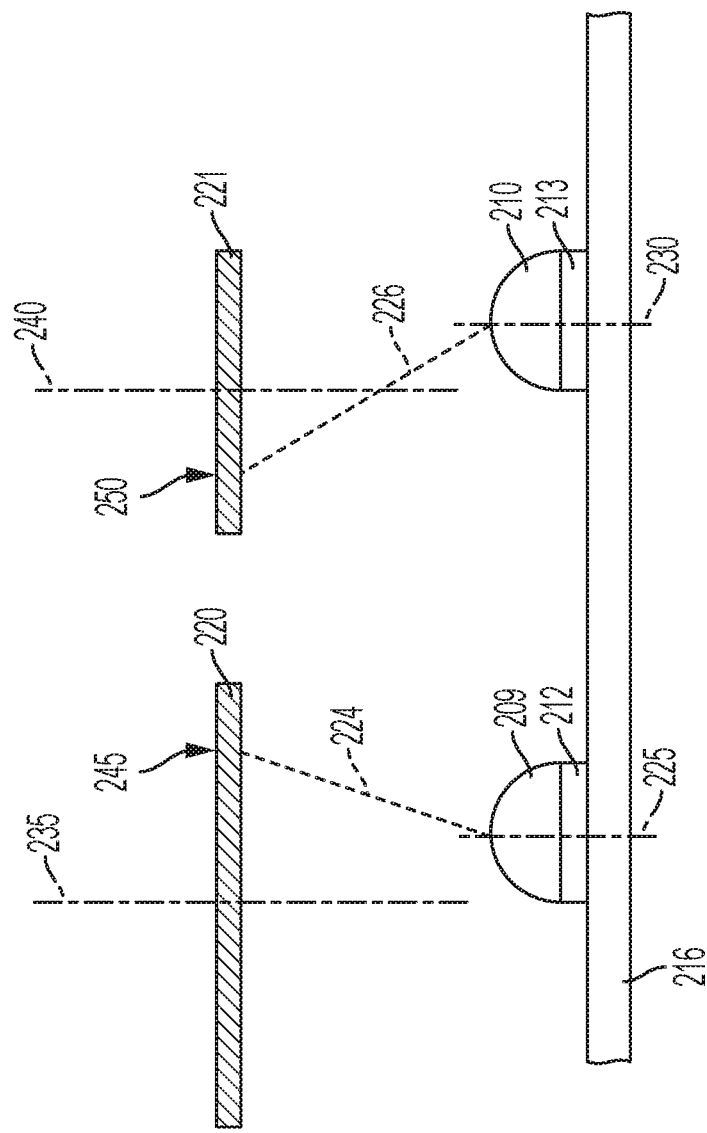

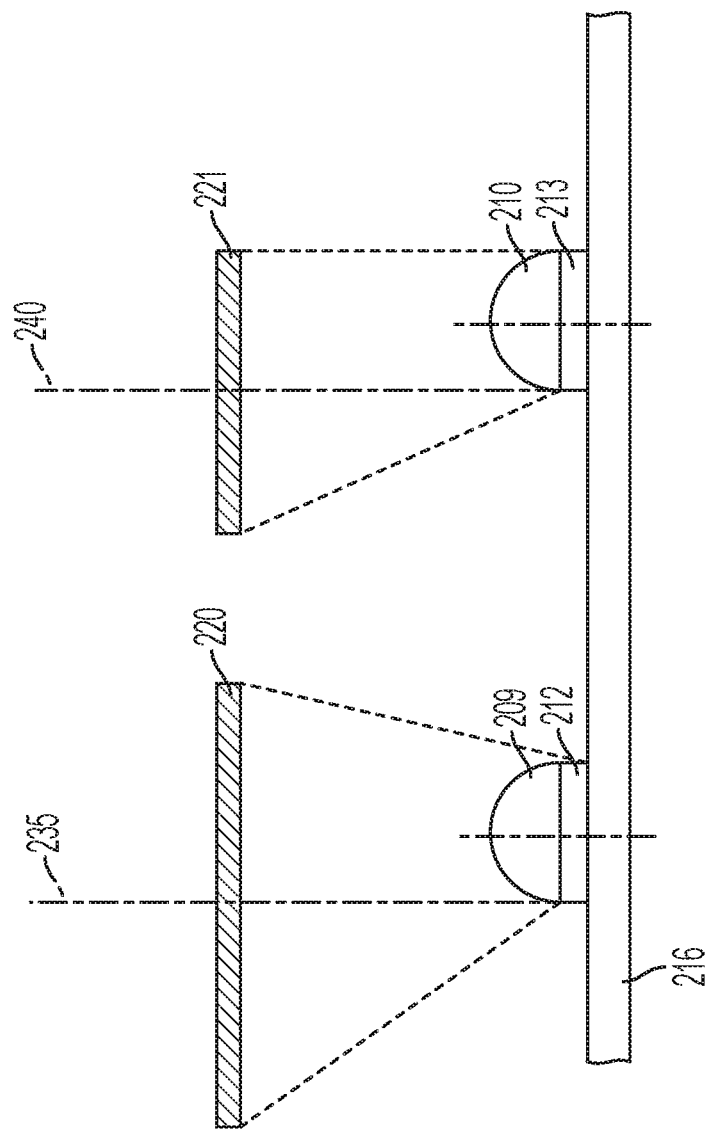

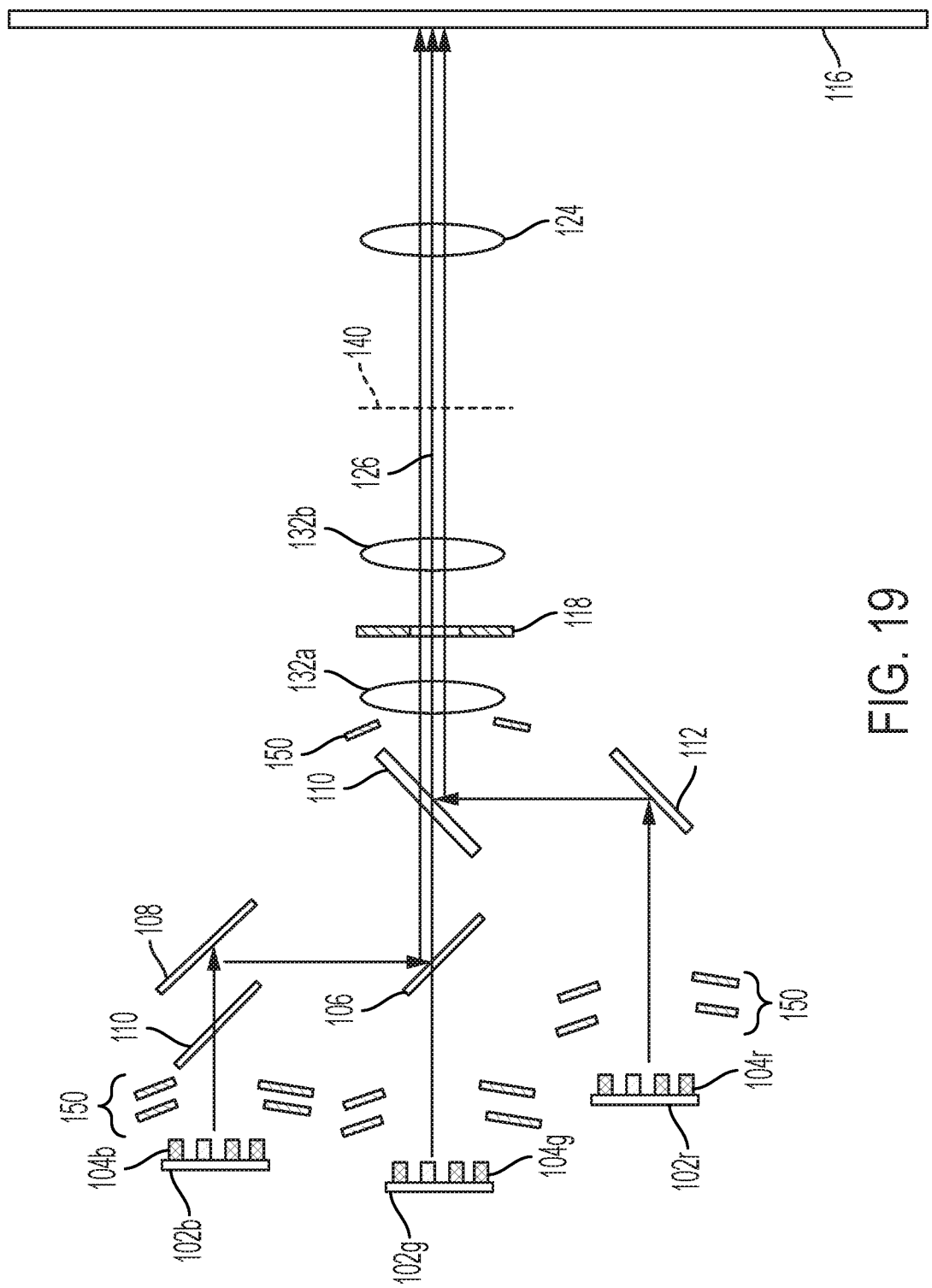

LIGHT CONDITIONING OF DIRECT VIEW DISPLAY FOR CINEMA

CROSS-REFERENCE TO RELATED APPLICATION

This claims the benefit of priority of U.S. Provisional Patent Application No. 62/585,869, titled "Light Conditioning of Direct View Display for Cinema" and filed Nov. 14, 2017.

TECHNICAL FIELD

This disclosure generally relates to electronic displays and more particularly relates to light conditioning for emissive display panels.

BACKGROUND

Large-scale emissive displays, such as displays formed from arrays of light-emitting diodes (LEDs) and related solid-state light sources, are being developed for advertising and entertainment use, providing highly visible image and text content. These devices can provide large area image content with long lifetimes and durability. Low power light-emitting arrays in which low power light emitters are pixels can be used for large area displays of image data, eliminating any need for a projection booth, as compared to high-end projection systems. Alternatively, high power light-emitting arrays in which high power light emitters are pixels can be used in a presentation system to project light emitted from the pixels displaying image data onto a display surface. Due to continuing advances in speed and color quality, emissive displays of these types offer promising opportunities for digital cinema presentation.

There are a number of obstacles to be surmounted to meet exacting demands for improved image quality and to satisfy the overall performance expectations of the digital cinema audience. One improvement to make emissive display competitive with conventional motion picture presentation is to condition the electronically generated light that forms the image content for more visually pleasing output. Aspects of image quality where improvement can be beneficial include overall light distribution, uniformity in angle and spatial intensity characteristics, color uniformity, and compensation to remove any pixelization that is perceptible at short viewing distances. Traditional film techniques that offer randomization of imaging elements in spatial and temporal terms can be beneficial to apply to the digital display. In addition to improvements to overall image quality, there is also the need to provide inexpensive, high-quality stereoscopic imaging, useful for many types of presentations, with reduced cost and complexity.

BRIEF DESCRIPTION OF THE DRAWINGS

The elements of the drawings are not necessarily to scale relative to each other.

FIG. 18A shows a positional arrangement of light sources that include diffusers of a first size and a first brightness of light centroid on the diffusers according to one example.

FIG. 18B shows a positional arrangement of light sources that include diffusers of a different size and different brightness of light centroid on the diffusers as compared to FIG. 18A, according to one example.

FIG. 19 depicts a hybrid direct emitter projector with baffles and a refractive relay providing an intermediate image according to one example.

DETAILED DESCRIPTION

Figure 1B:
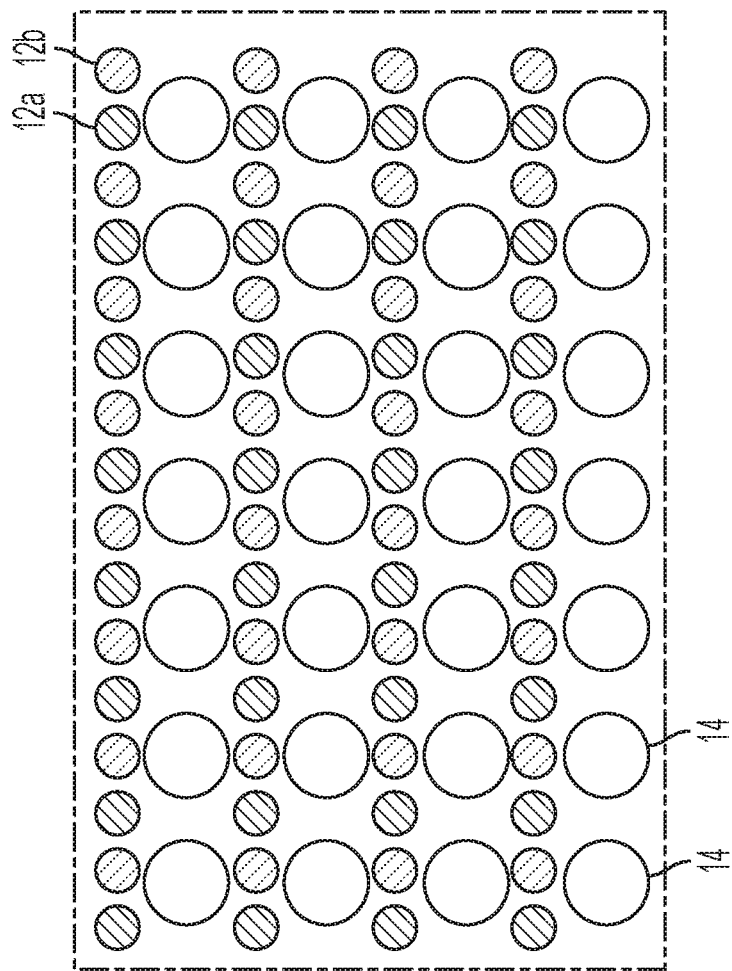
FIG. 1B shows an enlarged portion of the emissive panel of FIG. 1A according to one example of the present disclosure.

The following is a detailed description of certain embodiments, reference being made to the drawings in which the same reference numerals identify the same elements of structure in each of the several figures.

Where they are used in the context of the present disclosure, the terms "first," "second," and so on, do not necessarily denote any ordinal, sequential, or priority relation, but are simply used to more clearly distinguish one step, element, or set of elements from another, unless specified otherwise.

As used herein, the term "energizable" relates to a device or set of components that perform an indicated function upon receiving power and, optionally, upon receiving an enabling signal.

In the context of the present disclosure, the term "left-eye image" describes an image that is formed for the left eye of the viewer and a "right-eye image" describes a corresponding image that is formed for the right eye of the viewer. The phrases "left eye" and "right eye" may be used as adjectives to distinguish imaging components for forming each of the two images of a stereoscopic image pair.

In the context of the present disclosure, the term "emitter" applies to solid-state direct light emitting (emitter) sources, including but not limited to LEDs, OLEDs, Quantum Dots, super luminescent diodes (SLEDs), Metamaterial emitters or Micro-LEDs. In the context of the present disclosure, a direct light emitting pixel includes at least one or more solid-state direct light emitting sources of the same primary color(s), more than one emitter of differing primary colors, or more than one emitter of a differing polarization states whereby a single pixel is driven by a data source to represent a single portion of an image with a defined state of brightness and color and whereby a combination of pixels forms a complete image for at least one eye. In the context of the present disclosure, the term "emissive panel" refers to a combination of pixels formed of direct emitting sources or emitters arranged in a fixed pattern of rows and columns, pixels distributed uniformly, regularly, or irregularly in an area, with the pixels spaced apart but as perceived together represent at least a subset of a complete image display for at least one eye.

One acknowledged shortcoming of the image presentation available from current emissive light panels relates to a highly pixelated appearance. The typical image results from the common configuration of a set of regularly spaced fixed patterned with rows and columns of emitters such that emissive panels exhibit artifacts called "screen door" that can be distracting and detract from the image quality. Screen door artifacts occur due to the highly uniform pattern of non-emissive or perceived dark or lower light level areas between the regularly patterned pixels. The emitted light itself tends to be highly structured, with distinct bright spots that tend to give images a less pleasing video appearance, rather than a high-quality analog or randomized film-like appearance. This pixilation effect is partially due to the very small relative area of the emission light with respect to the actual pitch between pixels. Typical display emissive panel structures periodically position the emitters in the center of the area designated as a single pixel, with the surrounding area around the emissive element as a black surface. Displays using an array of these solid-state emitter pixels have often been designed for outdoor use, with the display visible at very far distances where the uniformly spaced gaps are not perceptible. The black area surrounding the emitter is advantaged for this application in that the black area absorbs most of the stray light incident upon the display surface itself, reducing visible "noise" and providing a superior contrast ratio, since only a low proportion of ambient light is returned to the viewer. The emitter then appears to be very bright against such a black background. The design of these displays is often intended that a viewer is most often more than one display height from the display and the resolution of the optics of the eye essentially spreads the smaller point emission area over the large full pixel area. Thus, the viewer is unable to resolve the higher frequency of the gaps between emitters.

In more demanding applications, such as cinema, direct view or emissive panel designs face a number of challenges. For example, the ambient light, while a factor affecting image quality in conventional cinema, is much more controlled and limited in such environments to low-level, theatre-safety lighting and stray light due to reflections from audience faces and interior surfaces of the venue. Stray light levels in a darkened theatre can be orders of magnitudes lower in ambient brightness than the stray light in a natural daylight environment where emissive panels have been successfully implemented. Immersive cinema where the viewers are more surrounded by the screen such as an IMAX cinema or even more extreme dome, or substantially hemispherical displays, can be more sensitive to the stray light artifacts, but can still be much less sensitive than outdoor emissive signage.

In the cinema environment, viewers can be seated at positions much closer to the screen, such as less than one screen height away, making the very linearly spaced gaps between emissive areas more pronouncedly visible and resolvable. Further, cinema environments involve better color, and spatial and angular uniformity, than do typical stadium and outdoor display environments. It can be desirable to maintain image quality continuously to a much higher level. Cinema quality displays often involve the ability to display three-dimensional content. Current large direct emissive display architectures fail to address this requirement. To help address these problems, embodiments of the present disclosure are directed to methods and systems for improved light conditioning and angular management, along with methods and systems for displaying stereoscopic images.

According to some examples of the present disclosure for a direct view or self-emissive panel that includes multiple addressable light emitters (which may also be referred to as light sources), light from these emitters or light sources can diverge away from the panel and be directed towards an audience. The angular divergence of this emitted light can span an angular range of at least ±20° to ±50°, depending on the design of the emissive panel and the theater. The angular light emission can be spatially uniform across the panel, or vary in angular extent, or directionally across the panel, depending on the design of the light emitters and the associated micro-optics.

In one example, a projection system includes a projection lens and at least one array of light emitting sources can form an arrangement of addressable image pixels by emitting image light that has a cone angle that exceeds the allowable cone angle of acceptance of light of the projection lens. The projection lens can receive the image light and direct the image light to a screen. The projection lens can have an aperture stop and a baffle that can block a portion of the image light that exceeds the allowable cone angle of acceptance of light of the projection lens. By using an aperture stop and a baffle in the projection system, expensive and detailed optical elements, per source, can be avoided and the projection system is not required to be highly efficient.

In another example, a display system includes an array of sources of light positioned on a display. Each source can emit light for an image pixel and has a center axis. The display system also include diffuser elements with each diffuser element having a diffuser center axis and being positioned in front of a corresponding source of light in the array. The sources of light of the array can be positioned uniformly in the array that is a grid array. Each diffuser element can be positioned such that the diffuser center axis of a respective diffuser element is spaced randomly with respect to the center axis of the corresponding source of light to display image pixels that are random spatially.

In a further example, a display system includes an array of sources of light on a display, diffuser elements, and optical elements. Each source of light can emit light for an image pixels and has a center axis. Each diffuser element has a diffuser center axis and is positioned in front of a corresponding source of light in the array. Each optical element is positioned between each diffuser element and source of light corresponding to the diffuser element. The sources of light of the array are positioned uniformly in the array that is a grid array and each diffuser element is positioned such that the diffuser center axis is spatially aligned with the center axis of the corresponding source of light. Each optical element can modify the light from the corresponding source of light to produce a light distribution on the diffuser element with a brightness of light centroid that is in a different position than the diffuser center axis. Different positions of the brightness of light centroid in the array can be random to display image pixels with spatially random brightness of light positions over the array.

Figure 1A:
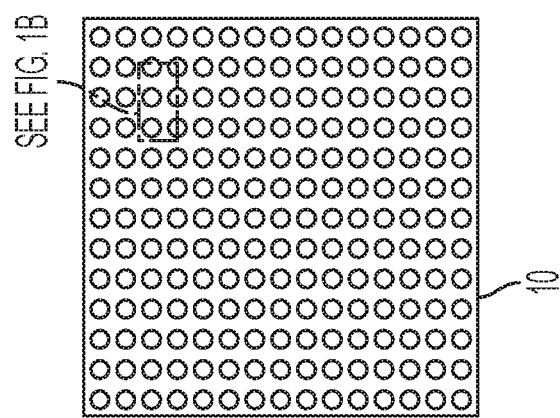
FIG. 1A is a schematic that shows the arrangement of emitters on an emissive panel according to one example of the present disclosure.
Figure 3A:
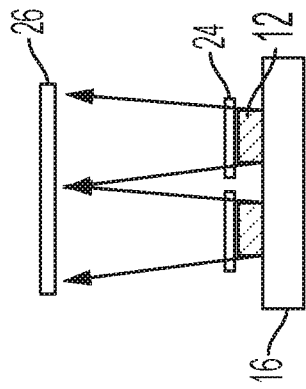
FIGS. 3A, 3B, and 3C is a side view showing a configuration with polarizers and diffusers at differing distances from the emitters according to one example.
Figure 3B:
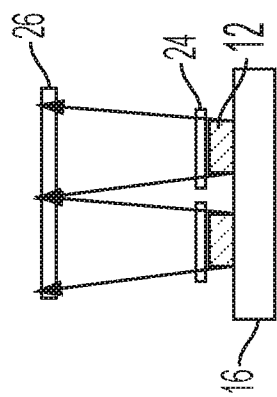
Figure 3C:
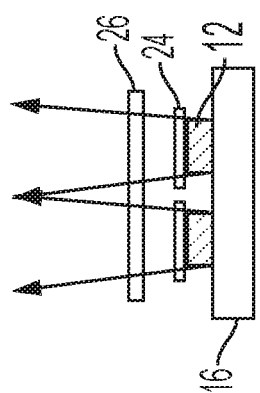
Figure 3D:
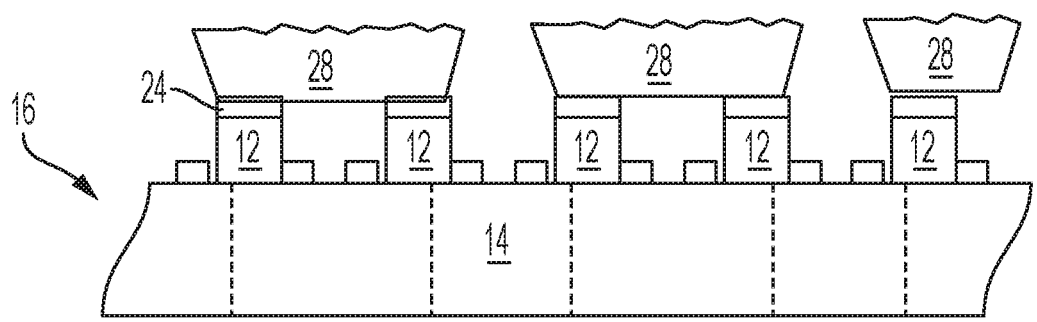
FIG. 3D is a side view showing a configuration with diffusers and polarizers according to one example.
Figure 3E:
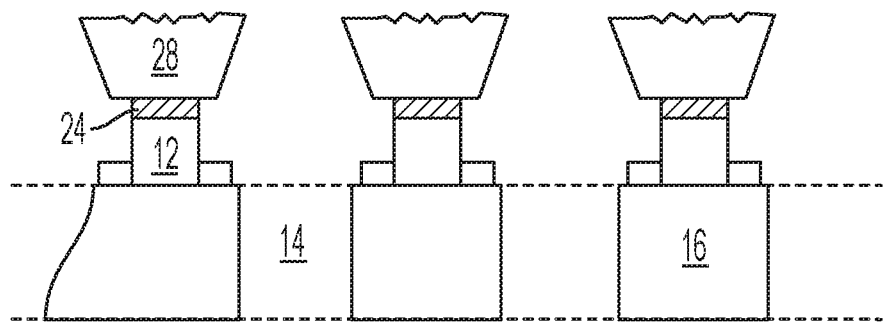
FIG. 3E is a side view showing a configuration with diffusers and polarizers according to one example.

FIGS. 1A, 3D, and 3E show, in schematic form, an emissive panel 10 having an array of rows and columns with one or more emitters (or light sources) 12 according to certain examples of the present disclosure. Each emitter 12 can include one or more light emitters, which can emit light of a given color or different colors, and be grouped with emission areas having the same or different size, shape, or spatial arrangement. Emitters 12 or emitter panels can be accompanied by a range of micro-optics, including lenses or lenslet arrays, reflectors, diffusers, light integrators, polarizers, wave plates or retarders, or filters. The area surrounding each emitter(s) 12 representing a single pitch of the area forms a pixel. In FIG. 1B, an enlarged area is represented, showing components of emissive panel 10 in a plane view. In the embodiment shown, emissive panel 10 has rows of emitters 12 and provides an arrangement of audio ports 14, or auditory transmission regions, that fall within the bounds of pixels containing the interspersed emitters 12.

Figure 1C:
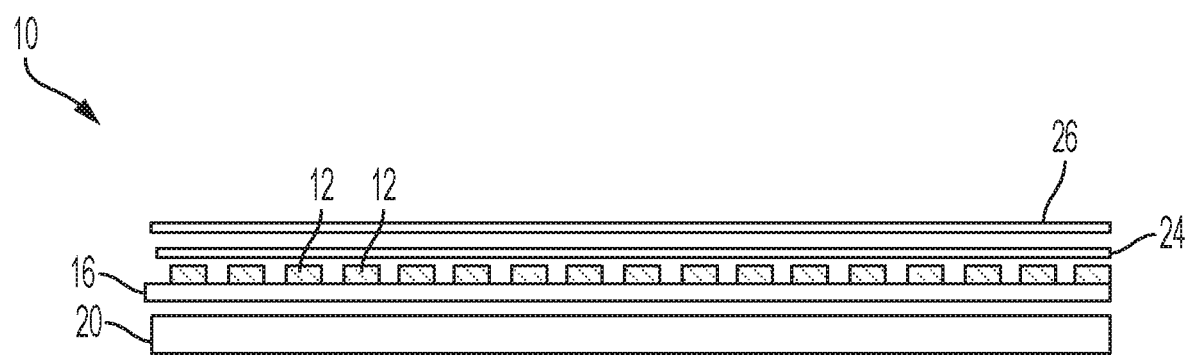
FIG. 1C is a schematic that shows the arrangement of emitters in side view according to one example of the present disclosure.

FIG. 1C shows a side view of panel 10 according to one example. The emitters 12 are mounted onto a circuit board 16 or other surface that provides wiring and mounting features, for example. A control panel 20 provides the logic and switching circuitry for activating the emitters 12, such as for providing varying amounts of electrical current to represent various colors as red, green, blue (RGB) combinations. Panel 10 can also have one or more polarizers 24, such as a sheet polarizer that transmits light according to its polarization axis. Polarizers 24 can be arranged to allow light of respectively orthogonal orientations from adjacent emitters. A diffusive element 26 that is a diffuser, lens, or lenslet array or other micro-optics can be provided to condition the light distribution from light sources 12 so that the final appearance of a displayed image is more film-like, for example. Diffusers can operate by providing a high degree of scatter to incident light, modifying the energy distribution to provide a more uniform illumination from the light sources 12. In FIG. 3A, the placement of the diffusive element 26 can be spaced above emitters 12 such that the angular divergence of the light emitted from emitters 12 fills a larger area of the pixel, as in FIG. 3A. One embodiment is to define the distance and convergence angle to substantially fill the space between pixels, as shown in FIG. 3B, where the light rays between two emitters roughly meet at the diffuser surface(s) thus reducing screen door artifacts. The options are to define this distance to reduce the screen door, just match the pixel spacing or even overfill (e.g., as shown in FIG. 3C) slightly to prevent obvious pixel separation. To the viewer, the diffuser can become the effective surface emitter 12.

In a direct emissions approach, a lens or lenslet array with a polarizing layer can direct light to optically fill the area between light emitters.

Polarized Display

Stereoscopic image display can be a significant value for successful implementation of direct displays for digital cinema.

Emitters 12 can be polarized or unpolarized to achieve stereoscopic viewing. In FIG. 1A, polarization of light sources 12 can alternate along the row or column. By way of example, in FIG. 1A light source 12a is shown as linearly polarized, with a transmission axis at +45 degrees. Light source 12b is shown as linearly polarized with an orthogonal transmission axis at −45 degrees. Alternately, other orthogonal linear polarization states can be used.

For stereoscopic viewing, the viewer wears glasses that direct light of a first polarization to form the left-eye image, with light of the orthogonal, second polarization forming the right-eye image. The viewer glasses correspondingly position a first polarization filter over the left eye and a second polarization filter over the right eye. The display controller then provides data to generate orthogonal polarization data for the left and right eyes in an alternating row (or column) arrangement, such that the left eye can substantially only see half (or a portion) of the emitters forming the image intended for the left eye with left-eye data. Similarly, the right eye can only see emitters driven by right-eye data that is orthogonally polarized with respect to the left-eye emitters.

Per an alternative example, left- and right-circular polarized light of mutually orthogonal states can be used rather than linear states. In this case, the glasses have quarter wave retarders in addition to a linear polarizer for separating the left and right eye views. In either configuration, the target contrast ratio between each of the eyes can be better than 200:1; this is the contrast between the intended polarization state versus the unintended polarization state. The achieved contrast ratio may be at least 500:1, which is possible to achieve given that the optical chain is similar to that used for other polarization-based stereoscopic projection techniques, without significant depolarization of the screen. The metalized screen surface of the so-called "polarization preserving" screen can be a significant contributor to depolarization in the optical chain.

Similar approaches for alternating polarization states have been used on smaller screens such as the XPOL® system devices used on JVC televisions to generate stereoscopic imaging. These screens have been retrofit with wiregrid polarizers and retarders by companies such as Arasor, where every other column of pixels is polarized orthogonally. Notably, this approach can reduce the resolution by half (or a portion) in one orientation (either columns or rows). This can be compensated for in large direct displays as additional pixels can be added in the larger space between pixels, a problem in small displays, but not an issue in a larger cinema-sized displays. The orthogonal states of left- and right-handed circular polarization can be utilized to enable relative insensitivity to head tilt of the observer causing crosstalk between the left- and right-intended images as compared to linear polarization states. Alternatively, emitters or groups of emitters can have the polarization temporally controlled to intrinsically rotate a half wave to provide left- or right-circularly polarized light, while preventing resolution loss or having to add additional pixels. This can need to be balanced against the added complexity of creating such a pixel along with the associated control system to toggle the state.

While polarization-based stereoscopic viewing has been the approach employed in digital cinema, alternative approaches can also be used with emissive displays. For example, stereoscopic emissive display can be created by spectral separation, using two different sets of primary wavelength bands (e.g., ≤10 nm wide and separated by ≥15 nm), providing the viewer with sets of filters that display the appropriate wavelengths for each eye image. Using the spectral separation approach in FIG. 11, each eye is paired with a single set of primaries (red, green, blue) for each eye, where the primaries of each eye are shifted in wavelength with respect to the other eye. In one arrangement, one eye has filter that accepts primary wavelengths that are shifted toward shorter wavelength values and blocks or reflects the primaries at longer wavelengths. The other eye has a filter that accepts longer primaries and blocks or reflects shorter primaries. For a direct display application shown in FIG. 1A, separate emitters 12a can be designed to emit the short wavelength primaries and another set of separate emitters 12b can be designed to emit the longer wavelengths. The resolution for stereoscopic viewing can be reduced to half as compared to 2D because each eye only sees half of the pixels. The eye filters can be tightly controlled to prevent crosstalk from each eye. Further, the field of view can be impacted by the effect of angular shift of the coatings. This can lead to color artifacts at the edges of the glasses. This can be a new problem for this display as many direct emitting sources shift in wavelength as they age leading to 2D color presentation errors or 3D color light leakage issues over time. The emitters can benefit from color stability methods.

The correct spectral separation can be achieved by various techniques depending upon the type of emissive solid-state structure. For example, LED devices typically vary in wavelength in conventional production processes. Binning may be used to select specific appropriate wavelength bands. Further, these devices have been found to vary in wavelength based upon differing operational temperatures or diode forward current. Although light-emitting pixels can be either heated or cooled, controlled local heating, such as with resistors or piezoelectric elements, can be easier to implement than cooling. While these parameters also change the brightness, this can be accommodated by adjustments in operation using pulse-width modulation techniques. Emitters can also be tuned by the deposition of spectral filters directly on the devices or as a separate filter on top. Other filter techniques such as photonic crystals can also be used. OLED wavelengths can be tuned by material property refinement. Quantum dots can be tuned by binning or control of the dot size. Even meta-material structures can be tuned by changing material properties or pitch properties of features to tune spectral bands. Additionally, tunable devices can be used in which the emission wavelength is adjustable by electronic, thermal, magnetic, or optical means.

In an alternate approach, temporal view control can be used. Shutter glasses are configured to toggle between separately timed images, with the appropriated sequenced data for each eye synchronized with shutter glass timing.

Both spectral and temporal approaches can be used for providing stereoscopic imaging for large displays. But, both of these alternate approaches may be more expensive and more difficult to maintain in a theatre environment. Polarization-based stereo viewing can be used as a display approach because it offers very high image quality and can be implemented with reusable or disposable glasses that are both durable and inexpensive. These are useful operational attributes for a successful digital cinema implementation.

One approach for polarizing the direct display can double the number of pixels used to achieve the level of resolution desired. Each pixel can then be designed or conditioned to provide orthogonal states of polarization. The pixel spacing can be modified either vertically or horizontally. Devices designed directly to emit polarized light may be desired, but the performance may not reached the desired contrast ratio.

Figure 4A:
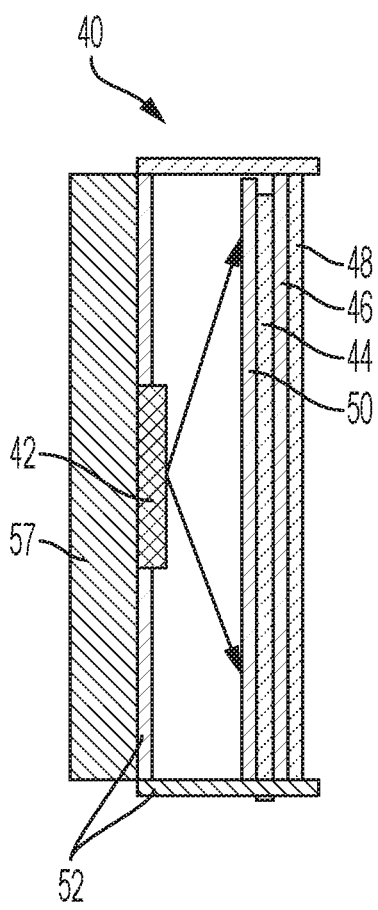
FIG. 4A shows a light emitter structure with a light conditioning structure according to one example.
Figure 4B:
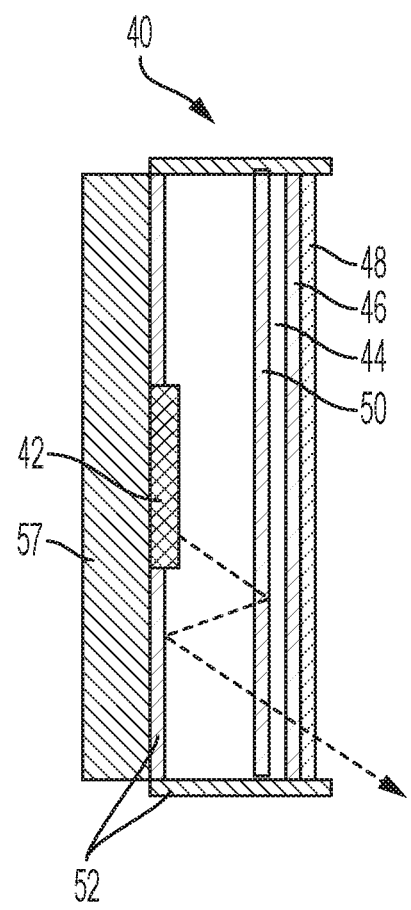
FIG. 4B shows polarization recycling using the light emitter structure arrangement of FIG. 4A according to one example.
Figure 4C:
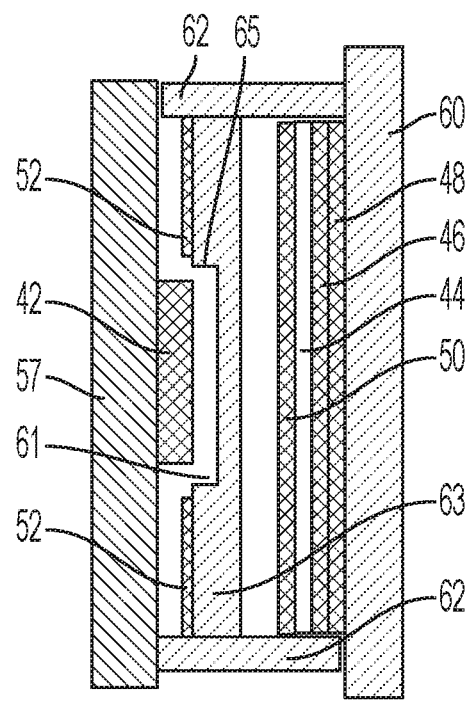
FIG. 4C is a side view that shows how the light emitter structure module of FIG. 4A can be constructed according to one example.
Figure 5:
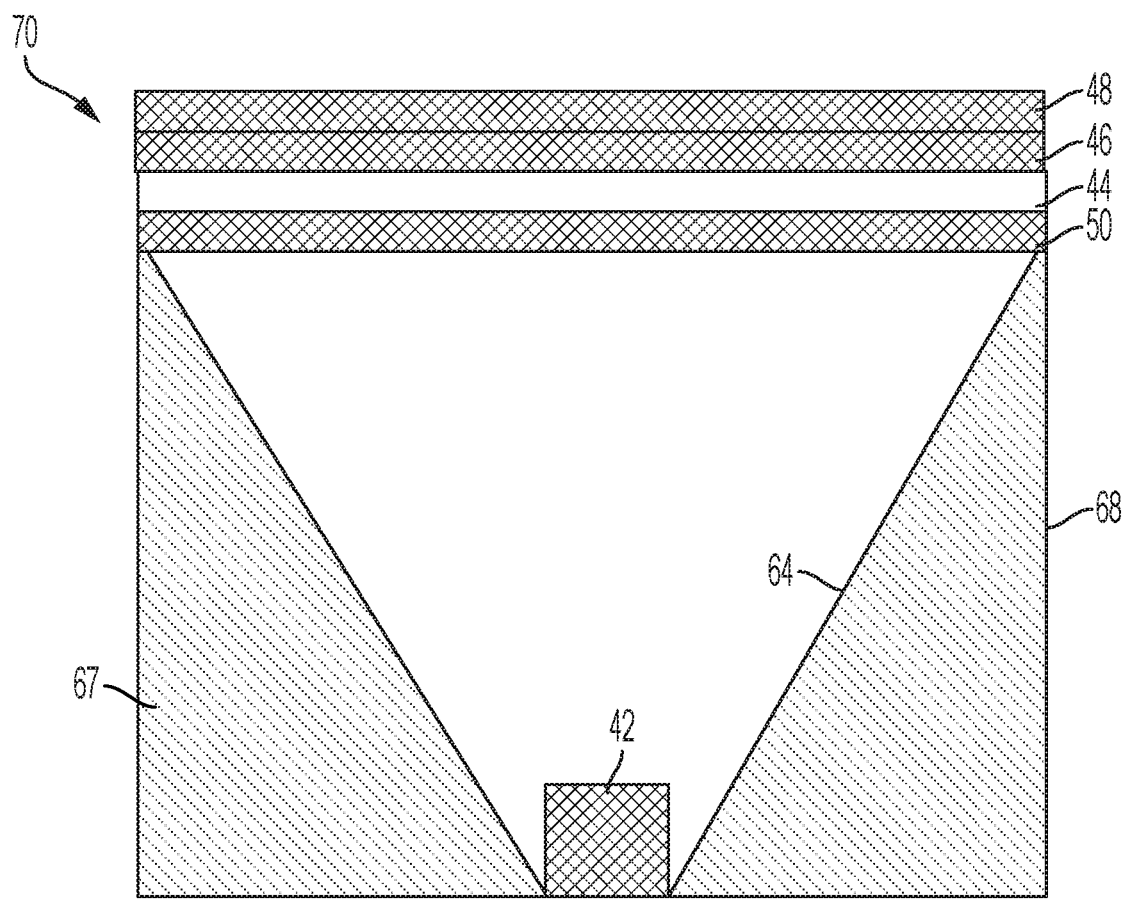
FIG. 5 shows a cross-sectional view of a light module that helps to efficiently reduce the angular extent of the light emitter according to one example.

Alternatively, individual pixels can be polarized by overlaying a separate structure on the array of light emitting elements, as is shown in FIGS. 1C, 4, and 5.

In the example shown in FIG. 1C, emissive panel 10 includes emitter(s) 12 that are mounted to a circuit board 16 or mounting block that allows for the mounting, electrical connection, and heat sinking of the emitter(s) 12. Control panel 20 with electronics for emitter(s) 12 may reside directly behind the light sources, as components of circuit board 16, or may be separated and electrically connected to the circuit board 16.

A polarizer 24 is incorporated on top of the emitter(s) 12. The polarizer may be incorporated directly as part of the light emitter structure, mounted directly on top of the emitter, mounted as part of a separate structure directly over each pixel, or mounted as a separate structure containing full rows, columns, or areas of pixels. The polarizer may include a linear polarizer that transmits a single polarization state, whereby alternating rows or columns can place polarization material for the polarizers 24 in orthogonal orientations such that two orthogonal linear polarization states can be emitting in neighboring columns or rows. Alternatively, rows or columns can have the same orientation of single linear state transmissive-polarization material in the path of the emitter light and an additional half-wave retardation structure (not shown) positioned over alternating rows or columns. In this manner, the alternating retarder material may be used to take similarly polarized emitters 12 and rotate the polarization state of the rows and columns in an alternating pattern. An additional retardation element, such as a quarter-wave plate, may be incorporated in conjunction with such polarization-selective elements to deliver left- and right-handed circular polarization states instead of linearly polarized orthogonal states. In either case, the glasses worn by the viewer can be designed to transmit one of the two orthogonal polarization states to each eye. This can correspond to correctly driven pixel data from a controller so that each eye receives the intended portion of the image for proper stereoscopic viewing.

Alternately, optical structures that take unpolarized light input from light sources 12 and directly or indirectly output linear or circularly polarized light can be used. These optical structures can include crystalline structures, film-based retarders, diffractive optical elements, photonic structures, dielectric or metallic thin film optical coatings, metamaterial or plasmonic structures, or waveguide structures. Polarization filtering of the unpolarized emitters can involve the loss of half of the light. This may result in heating of the structure that may degrade the emitter lifetime if not properly cooled.

Polarization recycling can be used to help boost light efficiency and brightness. Polarization recycling methods can redirect light of the alternate (rejected) polarization state through a retarder element that subsequently rotates the alternate polarization state of the light to a suitable polarization state for use by the optical system.

An optional diffusive element 26 as shown in FIGS. 1C and 3A may be incorporated directly or spaced apart from the emissive panel 10 as a means of reducing pixelization artifacts from the non-emissive areas between light sources 12. Diffusive element 26 may be a simple diffuser, structured diffuser, lenslet array, pairs of lenslet arrays, or other micro-optic devices alone or combined that changes spreads or mixes the input angle of the light. Diffusive element 26 may also be utilized to protect emissive panel 10 from damage in handling and environmental concerns. Diffusive element 26 may be directly attached to components within the emissive panel 10 structure. For example, the diffusive element 26 may be adhesively attached to components within the structure. This can include optical adhesives to reduce stray reflections. The diffusive or other optical elements in emissive panel 10 may be treated with anti-reflective (AR) coatings or treatments to further reduce reflections or optical losses. The diffusive element or other optical or optoelectronic elements may be treated with damage resistant coatings to prevent degradation due to environmental or handling concerns.

Polarizing intrinsically polarized direct display devices may be managed either at the individual pixel level, the individual column or row level, or over full areas of the display. Other display parameters that similarly can be controlled at the pixel level or more globally can include angular emission, both vertically and horizontally; spectral bandwidth; perceived emission spatial area; and randomness of the emission elements.

The angular emission of direct emissive displays often attempts to capture a full 180-degree field of view both vertically and horizontally, as applications to date prefer maximum viewing positions. In the best case, color contrast, light level, and viewing structure can remain constant over the full angular range. Often, however, this is not achieved. In practice, displays such as liquid crystal displays (LCD) exhibit significant angular changes of performance.

Changes in color, contrast, polarization, and intensity due to dielectric coating sensitivity of filters or changes in index of refraction, retardation, and dispersion of the materials in these displays can make off-axis viewing less than optimal. Additionally, the combination of separately fabricated emissive panels 10 shown in FIG. 2B into a larger display has variations in the batch of emitters 12, the black surface 22, surface treatments causing differences in perceived color or reflectivity. The emissive panels may not be perfectly angularly aligned to each other or may not be completely flat. These variations in angle between panels, where there is sensitivity to color or reflectivity, can also highlight panel differences. In these cases, the displays have distinguishing blocky appearances where individual emissive panels 10 are undesirably identifiable. Similarly, existing direct emissive displays exhibit intensity roll off, variations in stray light, and structural reflectivity and changes in specular properties as the viewing angle changes. This can make individual pixels or blocks of pixels appear very different with viewing angle. In a cinema environment, the requirements for consistency can be more stringent than for advertising display. Careful control of the emissive panel flatness and uniform and consistent application of materials is useful to minimize these artifacts.

Figure 12:
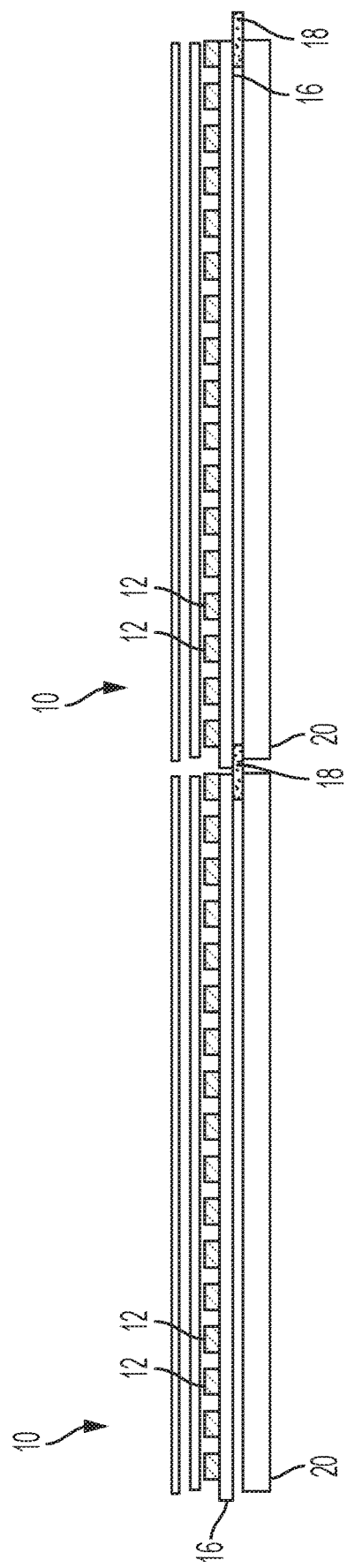
FIG. 12 shows adjacent display panels with a common reference surface according to one example.

In some examples, such as in FIG. 12, adjacent emissive panels 10 that are physically aligned to each other can be provided with a direct and shared angular mounting reference 18, whereby the elements visible by a viewer are angularly referenced to each other. Alternatively, it may not be possible to control the manufacturing properties well enough to insure seamless transition between adjacent panels. An alternative approach can include providing an angular adjustment of the visible elements of the emissive panel 10 to minimize the angular variations between panels. If the panels are flexible, each edge of the panel can be tuned angularly to match its neighbor's image quality parameters and prevent severe immediate differences from being visible between panels. Lower frequency changes in the angle may be acceptable to a viewer compared to a discrete change at one edge.

Viewing angles in the cinema can be further exacerbated by seating arrangements. The most extreme viewing angles in cinema are in dome or hemispherical or semi-hemispherical projection environments, where the screens are located beyond the sides of some seated viewers. This makes control of the angular performance a parameter to successful image delivery. The immersion that a viewer experiences by having a domed screen is distinct from most other cinema experiences. Direct display can be advantaged over existing projection technologies that currently include film or digital projection systems located with a very wide angle lens near the center of the radius of the dome screen. The screens may have very low gain to provide uniform angular performance and to reduce the amount of stray light from the side and rear images that reflects back to the central image. Regardless of this low gain, the images may be lower in contrast than offered by a flat or limited curved screen. Additionally, because a dome screen area is also very large compared to the area of average cinema screens, the projection system can be operated at very high lumen levels of about 60,000 lumens to provide a reasonable amount of light. Even with high brightness projectors, the image brightness is often limited to less than 4 foot lamberts, where a typical projection environment aims for 14 foot lamberts or more. Direct emitting screens can be useful because the brightness is controlled at the pixel level instead of an overall area.

Figure 13:
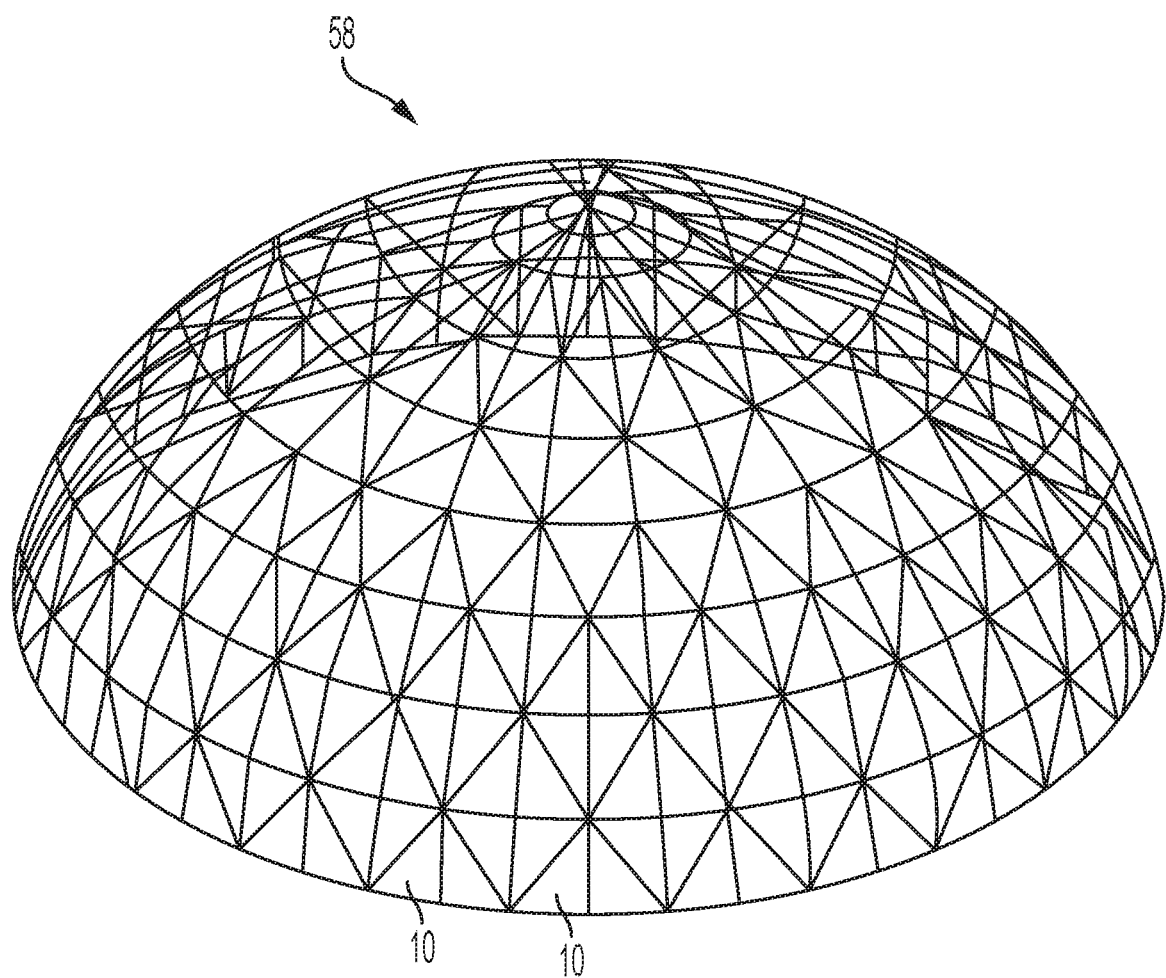
FIG. 13 shows a dome emissive display layout utilizing triangular display panels according to one example.
Figure 14:
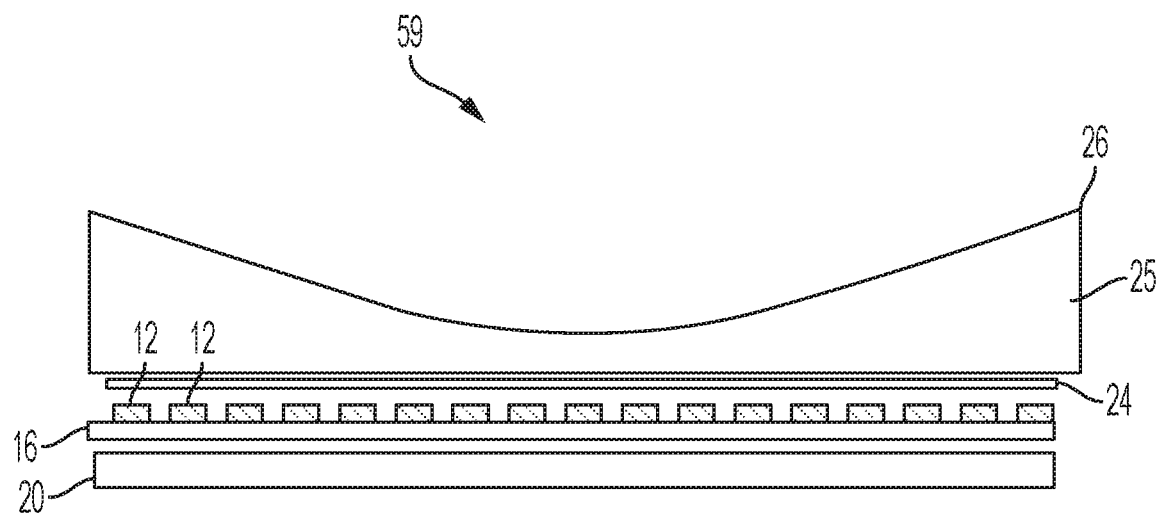
FIG. 14 shows a direct emissive display that is optically relayed into a non-flat shape according to one example.
Figure 15:
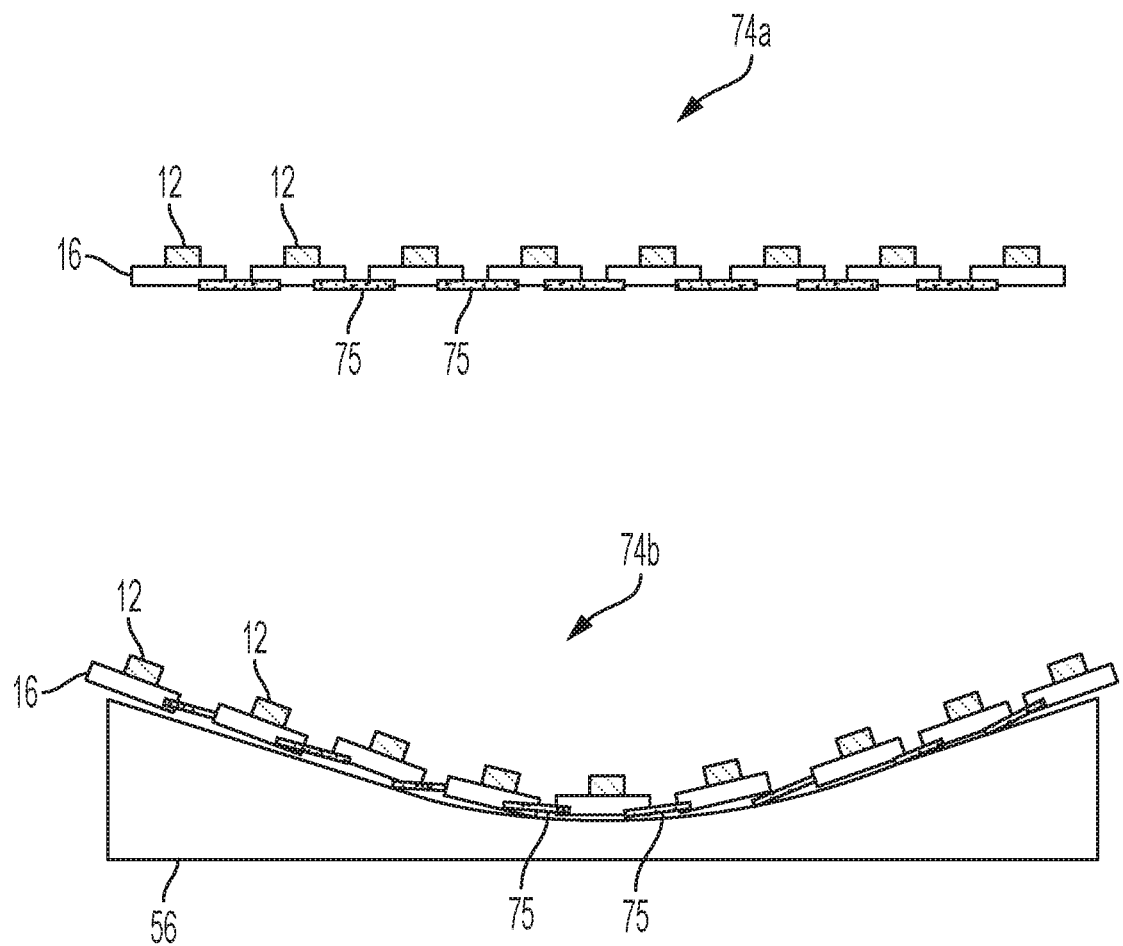
FIG. 15 shows a flexible direct emissive display that is fabricated flat and shaped into a non-flat shape according to one example.

In one example, shown in FIG. 13, of a direct emissive display structure 58 for dome applications, each direct emissive panel 10 is shaped as a triangle, hexagon, or other shape that has a different number of sides. This can reduce the amount of angular discontinuity between adjacent direct emissive panels there by improving uniformity and overall image quality. In the extreme case, direct emitting panels can be constructed to exactly match a segment of the spherical shape (or alternately shaped immersive environment.) This can be accomplished by a variety of methods. For example, emissive panel 10 may have its circuit board/mounting block preformed to a specific shape. Alternatively, shown in FIG. 14, optical methods can be used to create a relayed direct emitter structure 59 to a new shape from the essentially flat surface containing emitters 12 on a printed circuit board 16 with controls on panel 20. A layer of polarizers 24 can be positioned as shown. Optical relays such as fiber optic faceplates or other waveguides 25 can be molded, formed, or shaped to create an indirect new emission plane. In this example, the surface of the waveguide shows a diffusive element 26 either formed or attached directly as part of the waveguide 25. Alternatively, a method for fabrication and flexibility that reduces discrete angular changes is shown in FIG. 15 and embodies flexible display panel 74a with circuit board/mounting blocks 16 and emitters 12 flat during fabrication to enable easy placement of emitters 12. Between emitters 12 or groups of emitters 12 are flexible elements 75 that allow for continued electrical connection, but also allow either single or multiple angular adjustments to form a compound shape as shown in 74b. These flexible elements 75 can enable multiple directions of freedom to contour to a surface. The flexible elements 75 can be enabled through different methods such as hinges, flexures, or flexible materials. The shape can also be locked, mechanically, magnetically, electrically, or through use of polymers, adhesives or other form setting materials. Similarly, use of a preformed mounting structure 56 to create the shape may be used. An entire dome can be fabricated from a square or rectangular structure to simplify the building architecture. Each display panel 74b on mounting structure 56 can be custom created and mapped to the planar wall of the building. The mounting structure 56 can be 3D printed and subsequently assembled via one of the locking means discussed to form a unique segment of the immersive display structure. Alternately, the flexible emissive panel can be fabricated in whole, or in part, by printing one or more arrangements of emitters (e.g., OLED) or polymer or adhesive transferring micro-LEDs onto the emissive panel or substrate.

Stray light can be a concern in highly immersive dome-type environments. Space between each emitter may limit light from sources not associated with the emitter being reflected to the viewer or where light absorbing material is used to cut stray reflections from emitters around the rest of the display. The space may be a hole, pocket, relief, or designed structure such as a black mask or structural beam absorber, that may be formed and flexible as part of the display panel 74a, 74b or be a separate mask structure that lays over top of the display panel. It also can be a subsequent treatment applied over top, such as paint or coating applied through a mask to protect the emitters. Maximizing image performance under these conditions can be managed by the pitch or space between centers of emitters being less than or equal to the resolution of the eye of the closest seat to the screen in the auditorium. Additionally, each pixel can be independently energizable to enable adjustable brightness levels. The image quality of such an immersive experience can be optimized by creating a specific brightness profile such that the edges have substantially less emission light than the center of the screen for typical motion picture content. This can reduce the cross image stray reflections and potential distractions from edge images. Often, this content is out of focus and excessive brightness can over emphasize the content where the viewer is unable to resolve the image by refocusing their eyes. Lowering the brightness in the periphery can provide a balance of being able to perceive motion that eventually reaches the center of the screen and not fully pulling attention away from the main content delivered near the screen center. The level of brightness reduction can be a predetermined amount based on theatre design parameters of viewing conditions. Other profiles may be established for specific types of projection modes. For example, dome theatres can show start fields and space content. This content can desire a uniform profile, but as most of the content is black, crosstalk is limited.

Some immersive theatres, such as theaters by IMAX Corporation, offer approximately a 90-degree or greater horizontal field by 55-degree or greater vertical field of view when sitting in the center seat. Providing imaging light beyond those angles can reduce image quality to the viewer. Light outside these limits can become stray light that reflects from walls, ceilings, and floors. These secondary reflections may go directly into the viewer's eyes or may return to the screen, to be perceived by the viewer, lowering the intra-frame contrast ratio. To address, the field of emission of the direct emitters can be reduced. This can be accomplished by design of the theatre environment with light baffling. Adding angled structures to the walls adjacent to the screen whereby at least two wall reflections reduces the amount of light reflected back to the audience or alternatively using surfaces with textures that performs the same function at a finer special level. For performance on optical efficiency this is managed at the pixel level by incorporating an optical angular management device such as lenses, compound parabolic concentrators, lenslet arrays, light integrators, fins or plates, or angle controlling optical films over top of, or adjacent to, the emitters. Alternatively, structural controls can be designed into the emitter or into each pixel area structure. In one example, where an emitter emits light over too large a field to be useful, either a lens or a recycling structure surrounding the emitter can be used to redirect the light to a narrower angle. This light can also be redirected or expanded spatially to fill the spatial area between pixels where no light is emitted, thereby reducing the perceived screen door effect. In an example, the light decreased in angle can be completely utilized as viewer light. This optical efficiency can be accomplished by the combination of an angular control method as discussed in conjunction with a diffuser that is spaced above the emitter at a distance to match the non-emissive area. The etendue of the emitter can have the excess angular etendue converted to area by the combination of the optical angular management device and a diffuser element, which can also spatially and angularly affect the output. In one configuration, this combination of optical devices can maintain the etendue of the emitter out to the viewer with minimal losses.

In an example, as in FIGS. 4A and 4B, combined polarization recovery and spatially expanded light redirection is provided by a single structure. The entire light source 40 can be in place of light emitting source 12 in panel 10 of FIGS. 1C and 2B, which can include an individual light emitter 42 mounted to electrically connected mounting structure that is a heat sink 57 as shown in FIGS. 4A and 4B.

Additionally, light source 40 contains a structure surrounding emitter 42. The structure includes a reflective polarization layer 44, such as a wire grid film or substrate, which reflects one polarization state and transmits the orthogonal state. The polarization that is transmitted may be substantially angularly controlled by managing the distance from the emitter and the aperture size of the structure, providing an effective baffle for light beyond a design field of view. This aperture may be asymmetric to provide a different vertical and horizontal field as desired. The reflected polarization state can return back into the structure of light source 40. Reflector 52 can be designed to surround emitter 42 such that the reflected light from polarizer 44 is conditioned by retarder 50 to rotate the polarization state and is subsequently reflected at a surface of the reflector 52 and again retarded for a second time, providing a second chance at exiting through reflective polarizer 44. Retarder 50 can be laminated onto the polarizer 44. An off-axis polarization compensator (not shown) can also be provided between the light emitter and the polarizer 44 to improve the polarization performance of off axis or skew rays.

According to one example, a quarter-wave film can be used as retarder 50 that changes the polarization state of the return light to substantially circular polarization. Subsequent reflection by reflector 52 sends the light through a second pass through quarter wave retarder 50 to create substantially linear polarization that can be transmitted through polarizer 44. In this fashion, most of the light from emitter 42 can be used, rather than heating the structure and wasting energy. Further, the light can be spread into a larger area than emitter 42, while potentially limiting the exit angles of the light.

Figure 9:
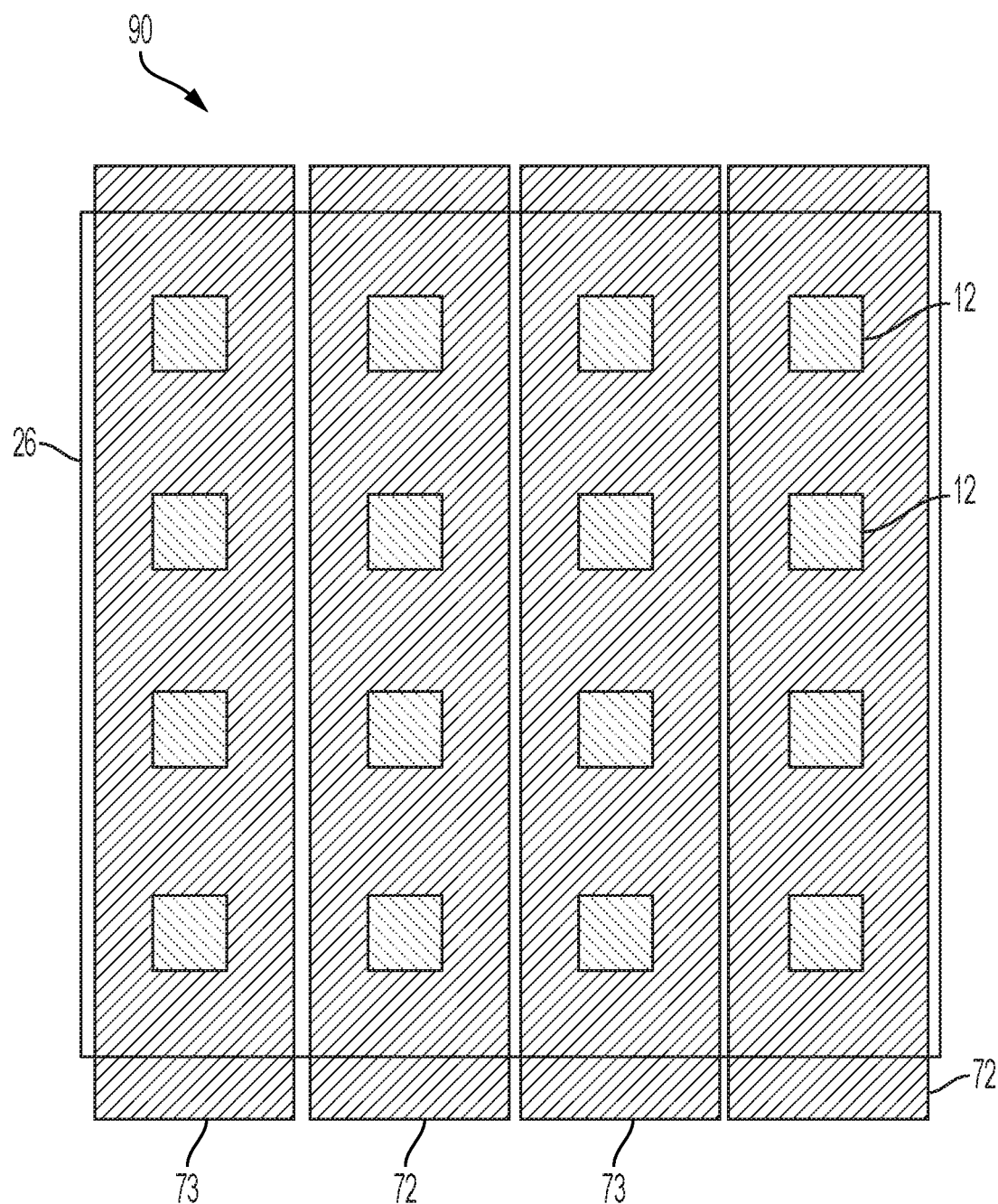
FIG. 9 shows a group of light emitters with strip materials overlaid above the group of emitters according to one example.

Multiple light sources 12 can be regularly or irregularly placed in an area to define an emissive display panel 10. Optionally, light source 12 may also include a quarter wave retarder 46 after the reflective polarizer 44 to convert the linear polarization exiting from polarizer 44 to circularly polarized light. As discussed earlier with respect to FIGS. 1A and 2A, the polarizer or retarder may be rotated for each light source 12 in alternating rows or columns to provide different polarization states to the left- and right-eyes, with associated polarization filter glasses provided to allow stereoscopic viewing. Where one axis of angular control aperture is used, the polarization recovery structure may be fabricated in full rows or columns to simplify fabrication, as exemplified in FIG. 9. FIG. 9 depicts an array of light sources 12 with a column of alternate polarizing strips 72 and 73 positioned over the light sources. Optionally, a diffuser element 48 may be included in the assembly following polarizer 44. Spacing the diffuser element 48 further away from the emitter 42 can further uniformize the light spatially to effectively fill areas between the actual emitter area of the emitter 42.

Additional coatings or optical devices can be included in this example. Anti-reflection coatings, such as AR lamination films, can be included on some of the elements, such as those with surfaces facing the audience, to prevent back reflections of light from occurring. An absorbing polarizer (not shown) may be used after the reflecting polarizer 44. This absorbing polarizer can reject one axis of unpolarized light that may return scattered light from the audience, while substantially allowing the correct polarization of emission light to pass through unaffected.

In another example, the reflective polarizer 44 can be replaced with an absorptive polarizer. This can eliminate unwanted reflections back to the light source 12, but also reduce the light output and create additional heat. A separate or included retarder or diffuser may be used to further address the spatial and angular requirements, with or without lenslets, or lenses may be used to further address angular and spatial fill.

FIG. 4C shows an example of a structure with cap 60 laminated with films containing reflective polarizer 44, retarder 46, retarder 50 and diffuser 48. The cap 60 may be made of molded plastic and the laminated film punch cut and adhered in a recess on the cap 60 for alignment. The cap 60 may also include a location feature to locate frame side 62. Frame side 62 can be a plastic molded part that attaches between heat sink 57 and the cap 60. The frame can include a transmissive window 63 or a hole, allowing the light from emitter 42 to pass unobstructed. On either side of the window area, a raised shelf 65 area can provide a lamination surface for a stamped reflector 52. Or a reflective coating can be provided if the molded plastic shelf is sufficiently birefringent. The assembly can have the frame 62 attached by glue, solder, or plastic staking to the heat sink 57. Subsequently, the cap 60 may be bonded or welded to frame 62. Subsequently, this example may be accomplished by integrating the various functional elements, such as a reflector and retarders, into single components.

FIG. 5 shows a cross-sectional view of an alternate example in which the emitter is accompanied by a micro-optical cone structure 67 to replace the frame structure 62. Surface of circle cone 64 may have a simple reflector surface, such as conical, hemispherical, or parabolic. Alternately, a more complex, but more efficient light collection structure, such as a compound parabolic concentrator (CPC) or a segmented 3D structure can be used for the cone structure.

In another example, a spectral filter is placed in the emission path. Many self-emission devices such as OLED or micro-LEDs, among others, can change their spectral output and brightness under different operational parameters such as they age, operating under different thermal loads, or are driven at different power levels. This can be challenging if the components change at a different rate. This may present a color uniformity problem as different individual elements or groups of elements no longer appear as the same color among the rest of the display at the same power levels. This can be addressed by periodic calibrations of each element and groups of elements at different set color levels and brightness levels. This, however, may be very cumbersome and time consuming and residual errors may remain and reoccur. Both brightness and color may shift such that a calibration of each, independently and together, can be implemented. Another solution may include positioning a spectral filter in the path of the emitter that is narrower in band than the expected lifetime change in spectral properties of the emitter. By cutting off the spectral edges of the emitter light, the device may spectrally shift with minimal change in actual output the light that reaches the viewer. For example, a 25 nm wide color filter can be provided to filter light from a light emitter with a 50 nm bandwidth. It can have a distribution, such as Gaussian distribution, of the spectral output of the emitter and a reasonably transmissive filter may not fully eliminate such shifts, but rather reduce the sensitivity, so calibration may still be implemented. Such a calibration may be stored and used to control the brightness and color to a standard.

Spectral filtering can provide a simpler means of calibrating the display. And, it can minimize the artifacts of each pixel shifting in color space independently of its neighbors. Regardless, the screen brightness may need some level of calibration on a pixel-by-pixel basis. This can be accomplished by reimaging the display on a calibrated camera with resolution as high as the full display, or segmenting the display measurements with enough overlap of measurement pixels to prevent measurement seams. A third method can be to incorporate independent sensing devices at the pixel level. These diodes can be positioned to pick up unused light from the display system. For example, if optical or mechanical angular emission reduction is utilized as discussed. The unused light can be directed or picked up by an incorporated detector. As sensing diodes also have shifts, a calibration of these diodes may be implemented as well. This may include measuring temperature of the diode and the sensitivity of the diode at the particular wavelength of interest. This can be done in the factory or in the field. As the diode may only be periodically active to recalibrate, shifts in performance other than temperature change may be minimal.

The screen-door effect can be a concern for cinema-grade, direct-display applications. The use of light absorptive surfaces surrounding the emission area can reduce the stray light impact of light incident upon the screen. Up-close viewing can be compromised as the small emissive area exhibits large gaps between pixels. Structures or materials, such as diffusers that effectively enlarge the emission area as perceived by the viewer, can reduce this perception.

A second issue regarding perception of screen-door artifacts is the regularity of the pixel application. The combined perception of the eye and brain are particularly sensitive to perception of straight lines and regular patterns. This digitization for general content creates an artificial look to the display of natural materials and can also lead to banding or aliasing artifacts with manmade objects of uniform frequency. While it can be easier to create display structures with neatly organized linear pixel orientation, it can be advantageous to deviate from these regular structures in a way to reduce the appearance of screen door effects.

Figure 10:
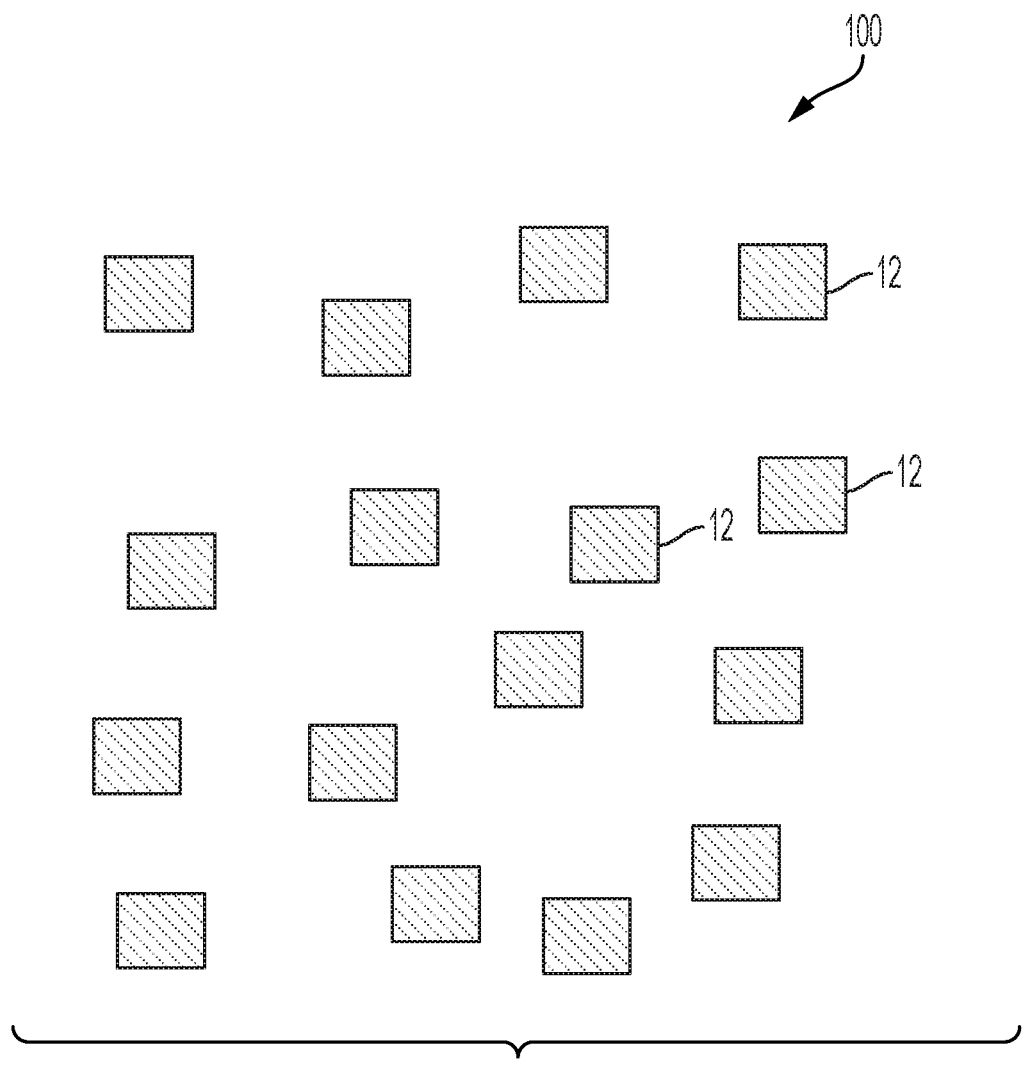
FIG. 10 shows a group of light emitters positioned in a random or pseudo-random lay down pattern on top of a mounting structure according to one example.

One solution is shown in the example depicted in FIG. 10. The emitters 12 are positioned in a random or pseudorandom pattern on the display. The pattern may be repeatable on a small enough scale to make it feasible to create and manage power connections, but large enough so that the eye cannot find seams or repeats. Further, the orientation or clocking of each panel of a larger display may be varied as well to further randomize between panels.

Figure 6:
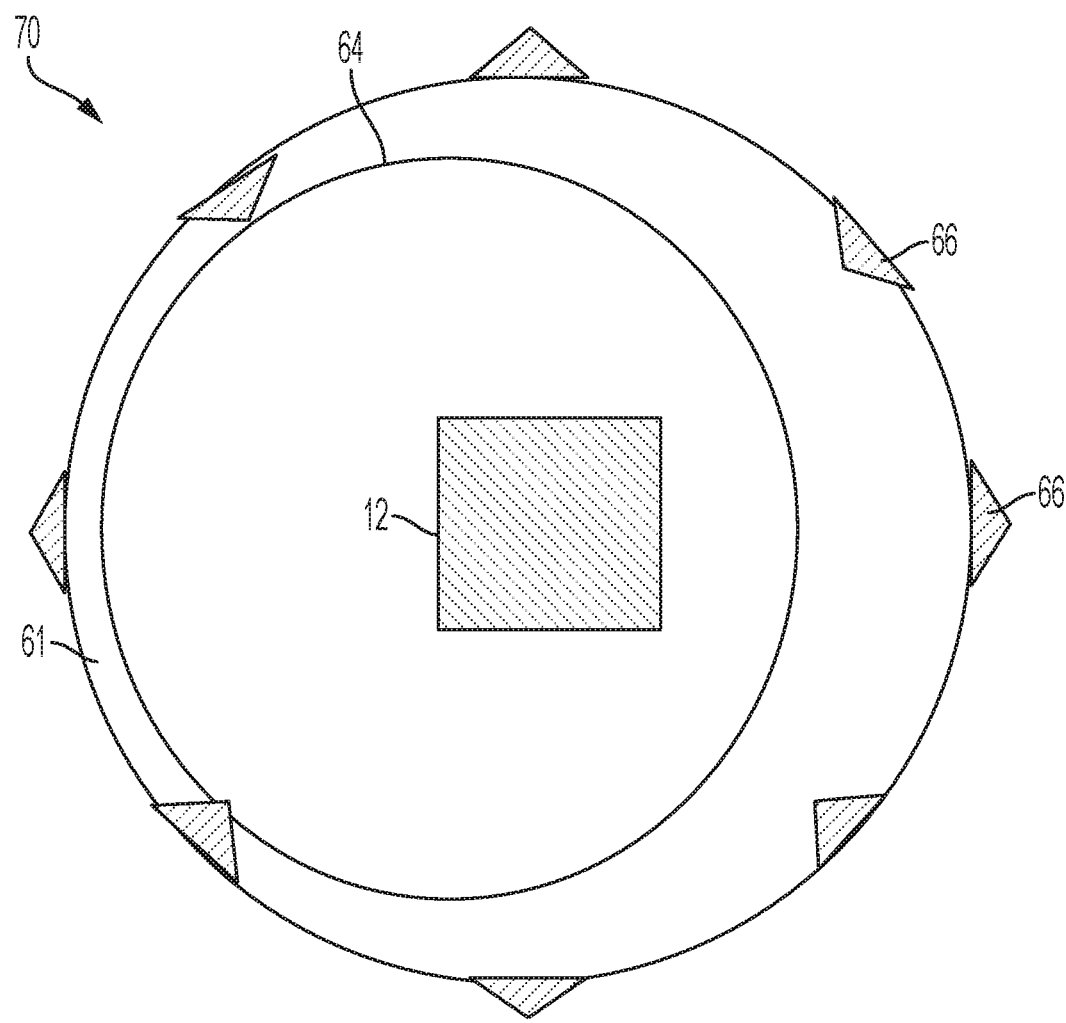
FIG. 6 shows a light emitter having a non-symmetric reflector according to one example.
Figure 7:
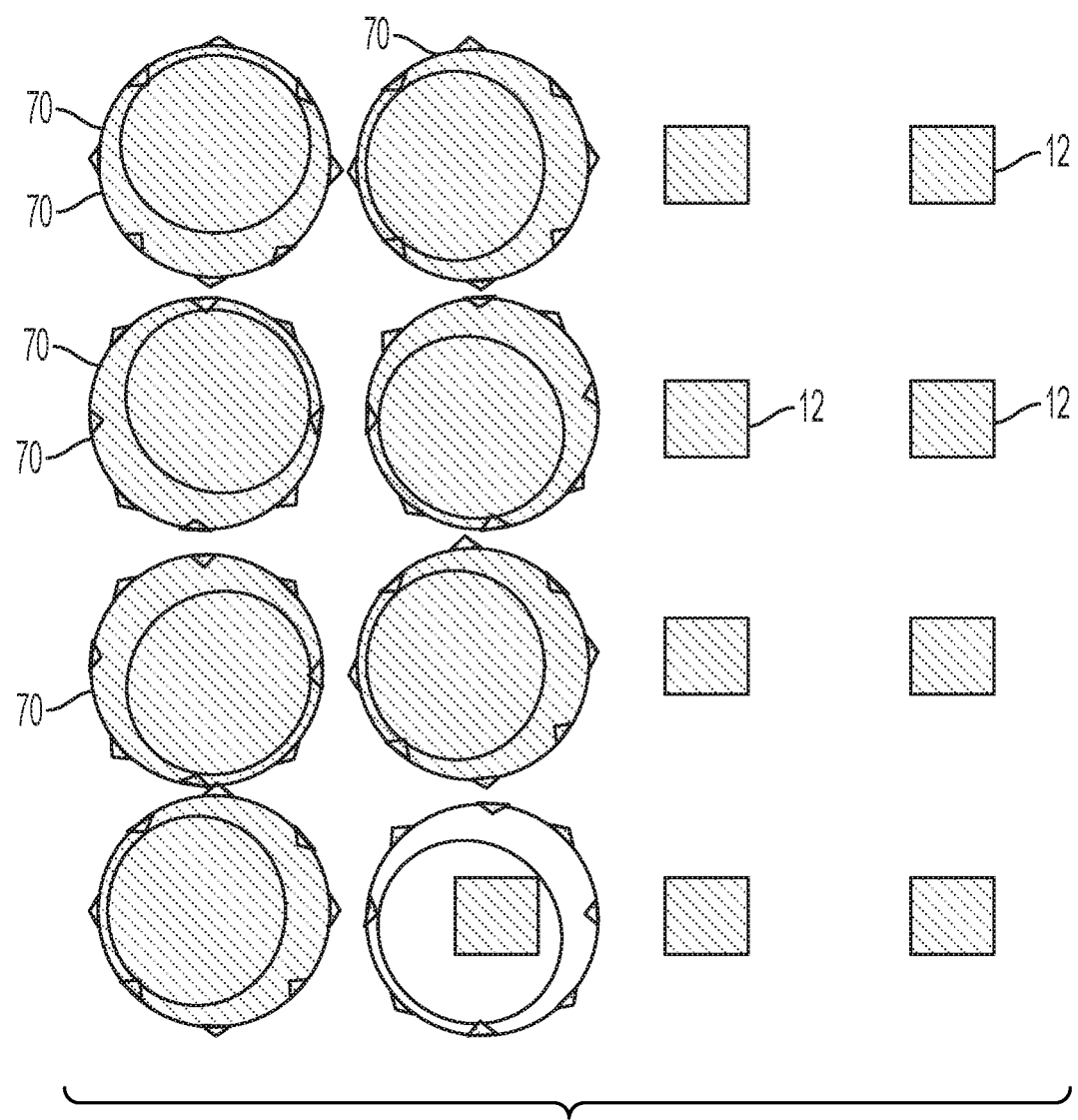
FIG. 7 shows a group of light emitters having non-symmetric reflectors in an array with randomized clocking according to one example.

An alternate method of reducing screen-door artifacts is to utilize the area expansion structures and optical elements such as discussed in FIGS. 4A-4C and FIG. 5, to create asymmetry and non-linear gaps between pixels. In one example, shown in FIGS. 6 and 7, an asymmetric structure with a functionality as shown in FIGS. 4A-4C and 5 is constructed. For simplicity, the cone structure of FIG. 5 is used as an example. In FIG. 6, the cone is the inner circle cone 64 surrounding emitter 12 and is fabricated into structure 70 in an asymmetrical pattern around the overall symmetric structure. As each structure 70 is circularly symmetric, the emission area as defined by cone 64 can be clocked around emitter 12 to change the narrowest gap 61 to the edge of structure 70. Features 66 are indents and protrusions that enable specific orientations relative to neighboring emitters 12, as shown in FIG. 7. In FIG. 7, multiple emitters 12 are fabricated in a regular array structure. Each emitter structure 70 can manage the light from individual emitters 12 such that the emission area is perceived to be larger than the actual emission area of emitter 12. The pseudorandom clocking of each structure 70 with respect to its neighboring structures 70 by interlocking means can provide for an effective randomization of the perceived emission areas from circle cones 64. In this fashion, pixels can appear to the viewer as irregular in spacing and position. The positioning, and asymmetrical design or shape of these asymmetrical cone structures can be averaged over at least a local group of emitters to reduce the risk that angular emission differences can create perceptible image artifacts.

Figure 2A:
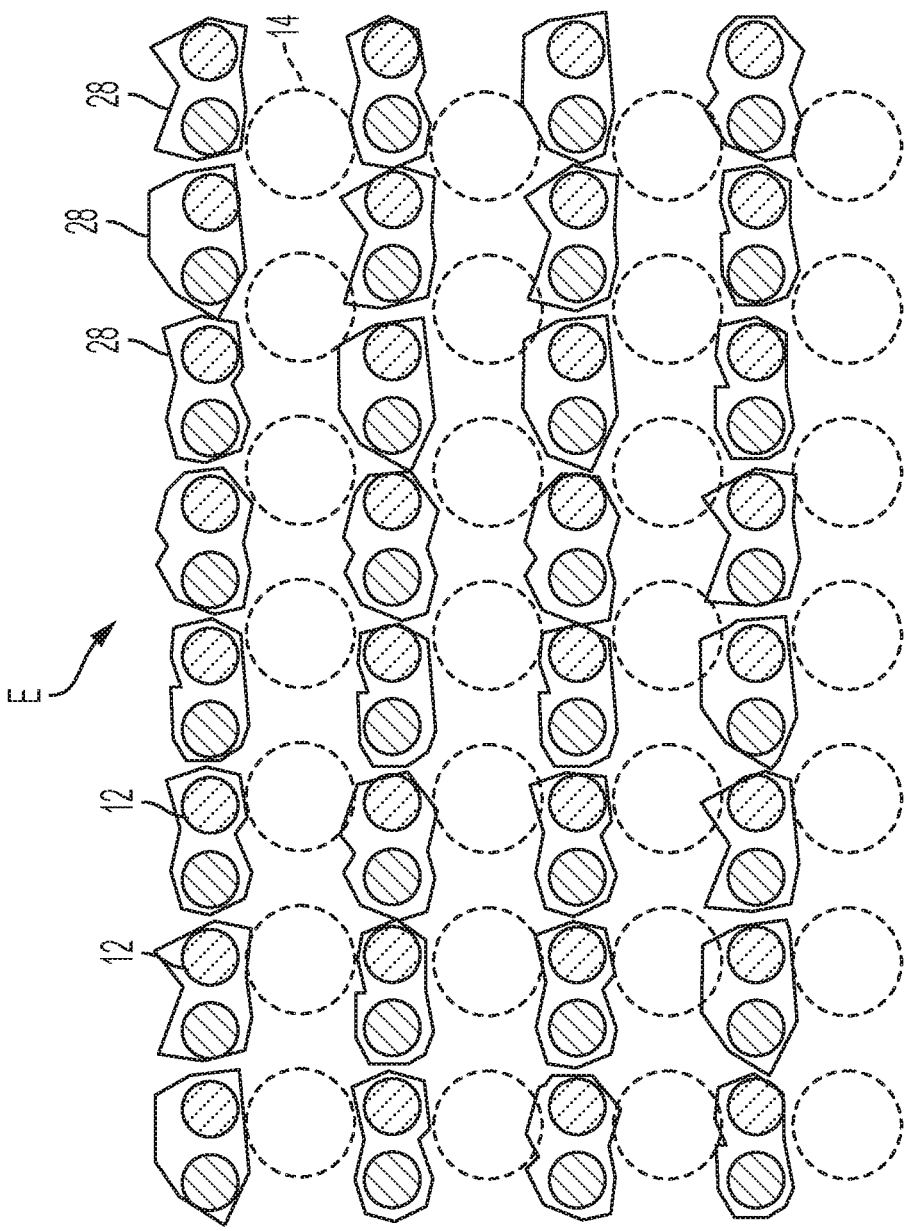
FIG. 2A is a schematic that shows the arrangement of emitters with diffusers on an emissive panel according to one example of the present disclosure.
Figure 2B:
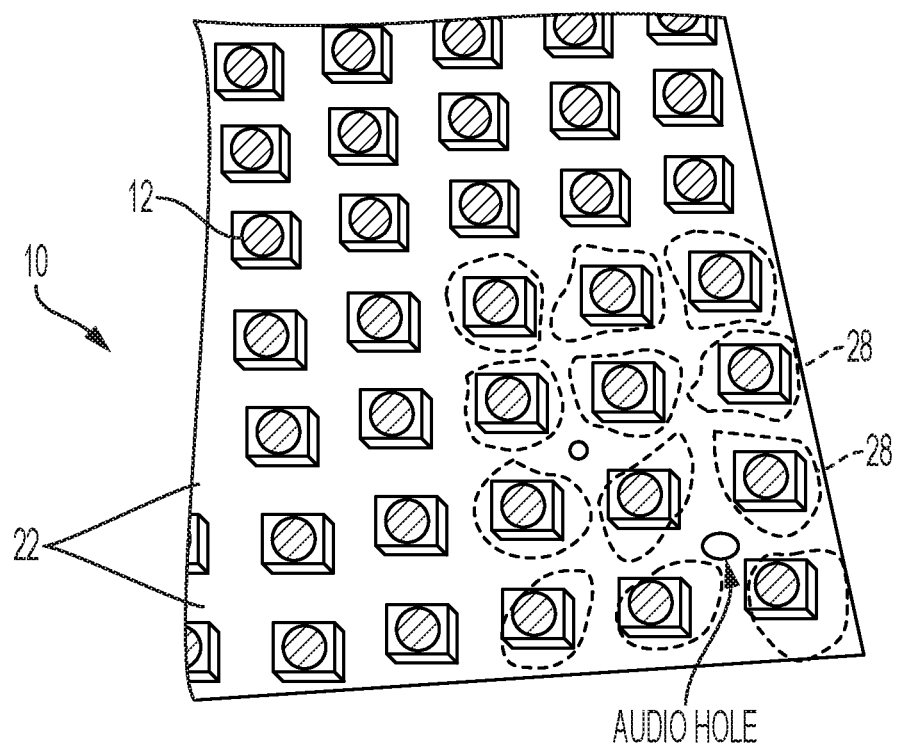
FIG. 2B shows a portion of an emissive panel with diffuser placement according to one example of the present disclosure.

Placing a structure or surface element, such as a diffuser, structured diffuser, or other component to randomize the perceived emitters 12 can be useful. FIG. 2A shows a light diffusing element 28 that can be a surface or structure element, such as a light diffuser or other light-spreading feature, over each of a pair of orthogonally polarized emitters 12. FIG. 2B similarly shows randomly shaped diffusers 28 placed over each emitter 12, thus effectively filling in the black surface 22 between each emitter 12. FIG. 2E shows how a sheet of randomized diffuser material with individual diffusers 28 having randomized boundaries over top of the arrayed structure of emitters 12 underneath. FIG. 2F shows the arrayed positions of the emitter centroids 30 without the diffuser material layer. The diffuser material can be a sheet of material with a diffuser design built in or the diffuser shapes can be individually mounted on each emitter. Alternatively, the randomized cone structures of FIGS. 6-7 can be used in combination with the randomly shaped diffusers of FIGS. 2A-E, for example as a paired combination with a diffuser mounted at the output plane of the cone structure.

While managing the polarization properties of the light emitting elements individually with additional components separated from each emission element is possible and functionally effective, this approach may be prohibitively expensive to fabricate at the pixel, row or column level. An alternative approach is to manage properties at the device level, where fabrication of these features can be added as steps during or after the fabrication of the bulk emissive elements. Examples of this approach can be to add a photonic structure(s), metamaterial structure, polarization element, crystal on top of a preexisting light emitter structure such as adding a planar diffractive element or photonic crystal structure element on top of each LED emitter that is created at the wafer level. These components can be used to tailor the respective angular properties, spectral bandwidth or polarization attributes of the interfaced emission element. Fabrication at the wafer level can use existing equipment and processes from the substantial base of silicon and optics industries to develop the features in bulk, thus only requiring the pick and placement packaging of the individual photonically enhanced emitter element.

One example of this approach is to take a wafer of uncut arrayed LED devices that is typically fabricated on a silicon or sapphire wafer, or a cut LED or micro-LED array device, and add polarization control optical components on top. For stereoscopic 3D, it can be useful to start with an unpolarized LED structure and add either a linear polarizer, circular polarizer, or polarization recovery device where the output polarization is in the same state. A linear polarizer can be achieved by overlaying a wire-grid structure such as fabricated by Moxtek of Orem, Utah. In this case, the rejected polarization state can be reflected back into the LED and most light may be lost to heat while some may be recycled again. The light that does not exit can create heat and potentially lower device lifetime. Other devices that may be useful can be to apply a photonic bandgap circular polarizer. This device can take an unpolarized light source and transmit only a single circular polarization state in a controlled bandwidth. This can provide polarization separation, a circular polarization state desired for stereoscopic viewing, and a reduced bandwidth for better color control. Having a narrow bandwidth filter over an LED structure that is thermally and electrically stable can increase the color gamut of the display and allow for color maintenance under drive and thermal conditions. This device can reduce the efficiency output and potentially redirect light back into the device further creating unwanted heat.

One structure to apply on top of an LED structure can be a cycloidal diffractive waveplate (CDW). The CDW device takes unpolarized light and transmits both one-handed circular polarization into a plus order and the alternate-handed circular polarization into a minus order, separated in angle from the incident light. Subsequently, an o-plate (also referred to as a compensation element) can be used to convert only one of the orders into an orthogonal state such that both paths have the substantially identical polarization state but are separated in angle. Thus, effectively all light can be used and very little is sent back to the LED as scatter or reflection. If desired, light redirecting elements such as prisms or grating structures may be added on top of this structure in strips over each order to lower the angular deviation between the two output paths. Additionally, absorptive filters or reflective dielectric coatings can be applied.

The arrangement of light sources 12 is simplified in FIG. 1A. In practice, each light source 12 can be a group of multiple LEDs or other light sources, having different visible wavelengths, such as a triad having a Red (R), a Green (G), and a Blue (B) diode, or alternately multiple light emitters of a different but related color (e.g., R1 and R2) for example. Alternately, each light source 12 or LED can represent a multicolor LED module. For example, a set of colored emitters (RGB) in the light sources can be combined to allow particular white points to be obtained. For Cinema quality displays this is defined by DCI standards with ultimately a DCI white and a REC 2020 color gamut to meet the modern standards of cinema color.

Some direct emission approaches have broad bandwidths on the order of up to 100 nm, for example LED's have a typical bandwidth on the order of 30 nm, while others like lasers can have narrow bandwidths around 1 nm. Having a broad bandwidth can result in the appropriate color gamut being difficult to achieve. Alternatively, a very small bandwidth placed at the correct wavelength can make a very large color gamut possible, but can lead to speckle artifacts. An example of a bandwidth for each major color that balances a large color gamut with reduced speckle risk can be between 8 nm to 20 nm to enable speckle to be managed, although the spectral intensities may not be necessarily smooth over the respective bands.

Figure 11:
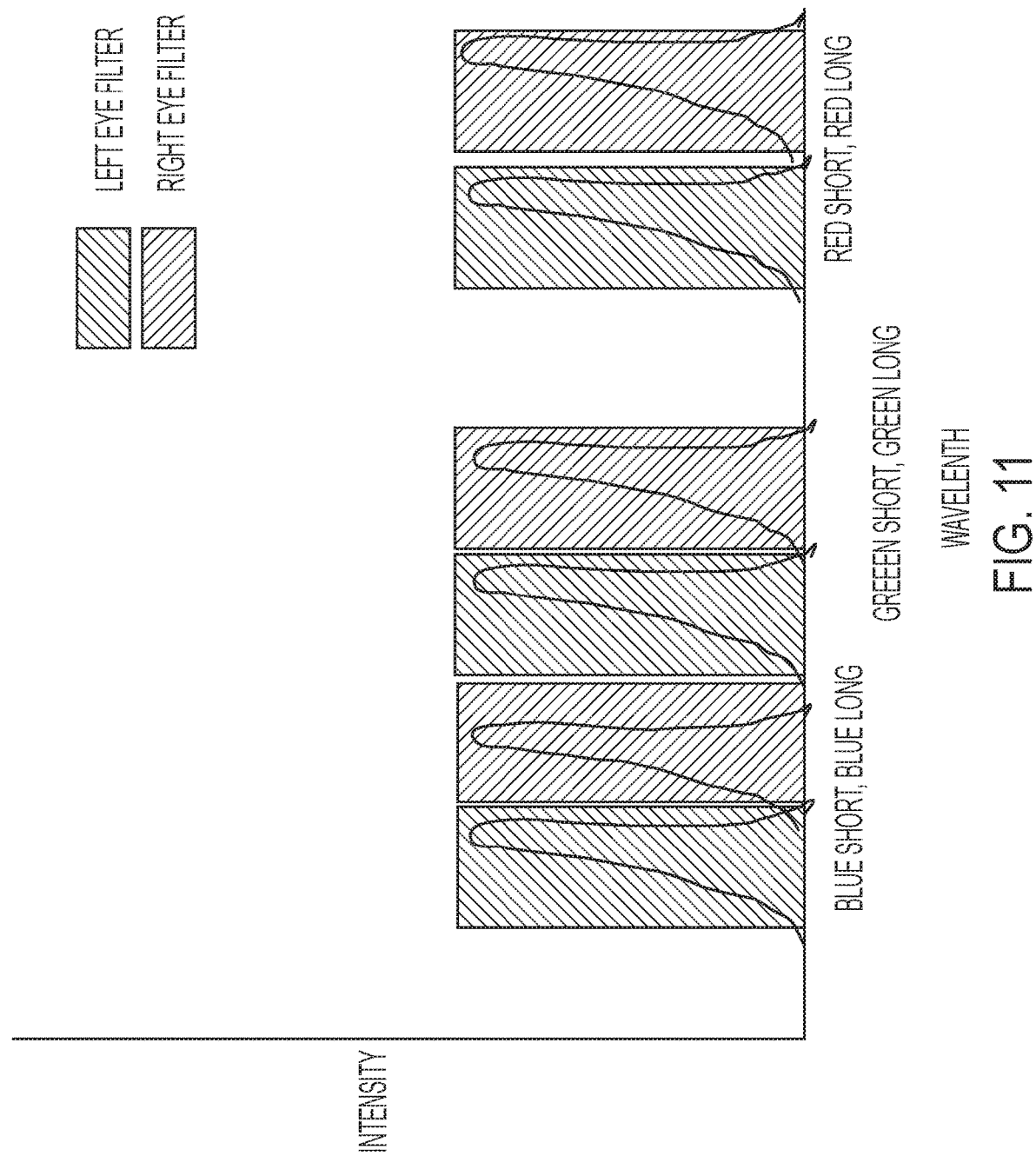
FIG. 11 shows the emission spectrum of long and short wavelength pairs of emitters and matching spectral transmission bands of eye-glass filters for a 3D direct emitter configuration according to one example.

Having an approximately 15 nm spectral width can enable utilization of two adjacent but separate wavelength bands within a particular primary color region, such as a long green and a short green, a long red and a short red, and a long blue and a short blue. A long color refers to the longer wavelength of the color as compared to a short color, which refers to the shorter wavelength of the color. As shown in FIG. 11, this can be utilized along with spectral filtering glasses that separates a particular primary (Red, Green and Blue), either long or short, for each eye. Thus, two different images corresponding to stereoscopic data can be simultaneously imaged to provide a 3D presentation.

Direct display systems that have two different polarization states or two or more sets of adjacent primary wavelength bands may be used for stereoscopic display, or instead to show different content to different viewers. With this approach, each viewer has identical glasses on each left and right eye. For example, the content for one movie is in a single polarization or a single set of adjacent wavelength primaries, while a completely different movie is on the second set.

By this method, in a single auditorium or viewing room, two or more movies can be played simultaneously, allowing viewers wishing to see different content to remain together in one location. For example, this arrangement can allow an adult to watch an R-rated movie with children watching G-rated material at the same time. This can allow a greater density filling of seats and thus better financial returns per operating hour. If additional primary sets are available more than two different sets of content may be shown. Additionally, by combining two different polarization states and two or more different adjacent primary wavelength bands, both stereoscopic and multiple streams of content can be viewed. Extinction ratio between polarization states or adjacent wavelength bands can be considered for this type of viewing. Since the images between two different content streams may be substantially more diverse than stereoscopic viewing, crosstalk between the content can be reduced.

While 200:1 contrast between eyes is considered acceptable for stereoscopic viewing, it may not be acceptable for multiple content streams. A figure of 500:1 or greater can be the minimum necessary contrast ratio, with 1000:1 or greater being possible. This can be more feasible to achieve with polarization of direct view systems than projection systems as the extinction is typically limited by the depolarization of the projection screen.

In situations where different content is shown to different viewers by selective glasses, separated audio streams may be used. Audio crosstalk can be best managed by each participant having noise isolating or noise canceling headphones or headsets. A control means can be available to each seat or headphones to enable the audio content to match the glasses. One method can be to synchronize the glasses with the headset. An RFID in the headset can trigger the correct headphone signal to be provided, for example.

Different emitters can be used to provide different adjacent wavelength bands or different polarization states for each eye, but other technologies may allow these parameters from a single source, with temporal changes between emission states. For example, emitters may be developed to be tunable in wavelength by means of thermal or electrical property change. The same may be possible for polarization state, where the polarization is switchable through electrically controlled magnetic field, diffractive interference, or other effect. Either of these types of devices can be desirable in that half the number of emission elements may be used.

Diffusion

Additional features to diffuse light from light sources that are light emitters for display are described below. Such features can be included in light emitting array designs.

FIG. 2A shows a top view of enlarged area E for diffuser features having an arrangement according to one example. Diffuser element 28 can be polarization-conserving diffusion elements having a non-uniform shape and spaced to condition light about individual light sources 12 or about groups of light sources 12.

FIG. 2B shows outlines of diffuser elements 28 over emissive panel 10 according to one example. A useful feature of emissive panel 10 shown in FIG. 2B relates to absorptive black surface 22 between diffuser elements, coated or painted to absorb stray and reflected light.

Figure 2D:
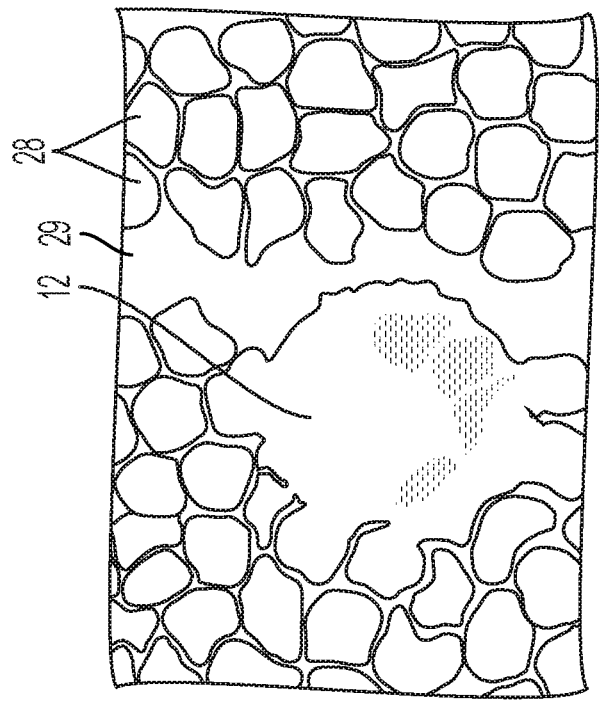
FIGS. 2C and 2D show plan views of randomized diffuser arrangement according to one example of the present disclosure.
Figure 2C:
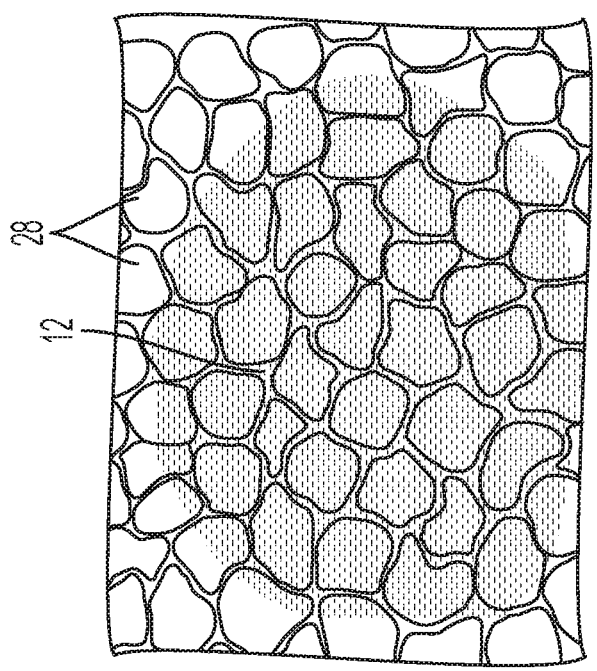
Figure 2F:
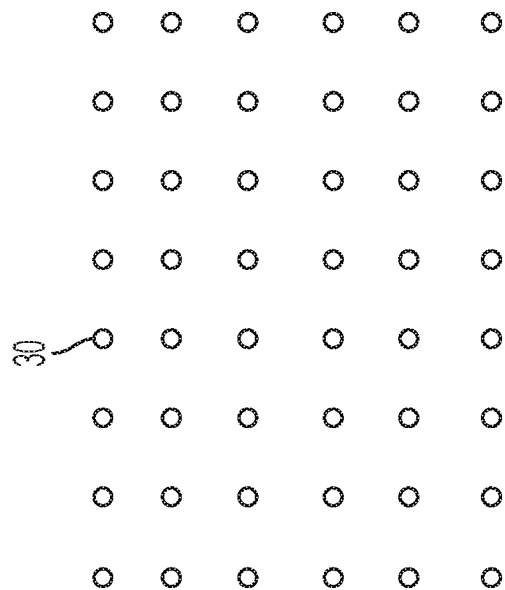
FIG. 2F schematically shows pixel randomization provided using randomized diffusers according to one example.
Figure 2E:
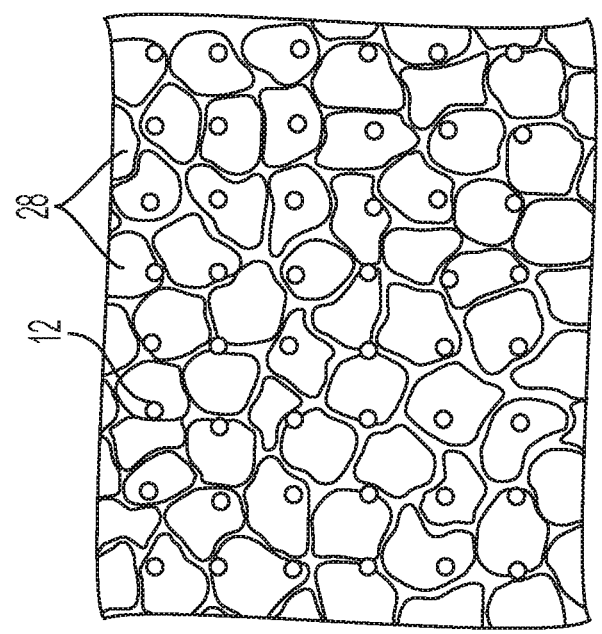
FIG. 2E shows use of a randomized diffuser over an emitter array according to one example of the present disclosure.

Other types of diffuser elements 28 arrangements are possible, such as those shown in a randomized arrangement in FIGS. 2C and 2D. Randomization of size, shape of the gaps between diffuser elements can help to eliminate the appearance of straight lines along rows and columns of light sources 12. For example, the gap 29 in FIG. 2D may be between two emitter panels to eliminate the appearance of a straight line between the two emitter panels. In FIGS. 2C, 2D, and 2E, examples are shown of diffuser surfaces or structures with different patterns that are "organically" shaped, providing randomized gaps. Randomized gaps between diffuser element 28 features can provide larger sized gaps without introducing screen-door effect compared to regularly shaped gaps, and may improve audio transmission, while randomized gaps may further reduce audio resonance between the diffuser elements and the circuit board.

Diffusive element 26 of FIG. 3A can be provided on a sheet or other layer that is overlaid onto the array of light sources 12 and polarizers 24. Alternately, diffuser elements can be diffuser elements 28 in FIGS. 3D and 3E with a greater thickness than a sheet, for example molded structures of PMMA with a diffusing pattern, which may be polarization conserving, on the front towards the audience, allowing for the beam to diverge more before it reaches the diffusing pattern, where diffusers 28 are coupled to each light source 12 or to small groups of two or more light sources 12, as shown in the cut-away side views of FIGS. 3D and 3E. The diffusing pattern on the front of the diffuser element 28 may be molded or embossed and may additionally have beam shaping characteristics and may include a Fresnel lens pattern or use other diffusing and beam shaping techniques. Alternately, a diffusing film may be placed on the front of diffuser 28. Audio ports 14 can be configured with a suitable size.

FIG. 4A shows the modular structure of a light source 40, such as an LED emitter serving as light source 12 according to an example of the present disclosure. An emitter 42 that is a high-brightness LED provides light from its surface when energized. The light, typically having a Lambertian distribution with high angles, can be directed through a polarizer 44, such as a wire-grid polarization film (for example, fabricated by Asahi-Kasei). In place of the retarder 46 can be a first diffuser that is a directional angle-reducing diffuser film (for example, light-shaping diffusers fabricated by Luminit). A second diffuser 48 is also a light-shaping diffuser film, oriented at an orthogonal to the first diffuser. A heat sink 57 is provided at the rear of the LED module.

As traced in FIG. 4B, light recycling is provided for light having the polarization state that is reflected, rather than transmitted, from polarizer 44. A quarter-wave retardation film 50 (such as fabricated by Teijin Films or Nitto Denko) lies in the path of reflected light from polarizer 44. Light directed through the quarter wave retardation film 50 is then reflected from a broadband reflector 52, such as 3M Broadband Giant Birefringence Film, for example. A second pass through quarter-wave retardation film 50 changes the light to the polarization state that transmits through polarizer 44.

FIG. 4C is a side view that shows how the LED module of FIG. 4A can be constructed. A molded plastic cap 60 can be formed, having the polarizer 44, retarders 46, 50, and diffuser 48, that can be films laminated into the cap structure. A second part of the cap has a center-punched laminated film formed between molded standoffs. Sides of frame 62 can be shaped as round disks. End posts can be blackened to prevent leakage light.

FIG. 5 shows a cross-sectional view of an alternate type of LED emitter structure 70 using a molded reflector that is circle cone 64 for directing light. Polarizer 44 can be a wire grid film. Retardation film 50 can help to reduce back-reflection. Diffuser 48 can be a molded component. A side surface 68 can be blackened to reduce reflection.

The molded cap arrangement shown in the plan view of FIG. 6 can be used to vary the symmetry of the light from an array of LED emitter structures 70 as a further measure for introducing a measure of random distribution. Here, LED emitter structure 70 is intentionally fabricated with the LED light source 12 directing light using a non-symmetric reflector that is circle cone 64. Clocking features 66 allow the LED emitter structures 70 to be rotationally varied upon installation in the emissive panel 10, as shown in the plan view of FIG. 7.

Figure 8:
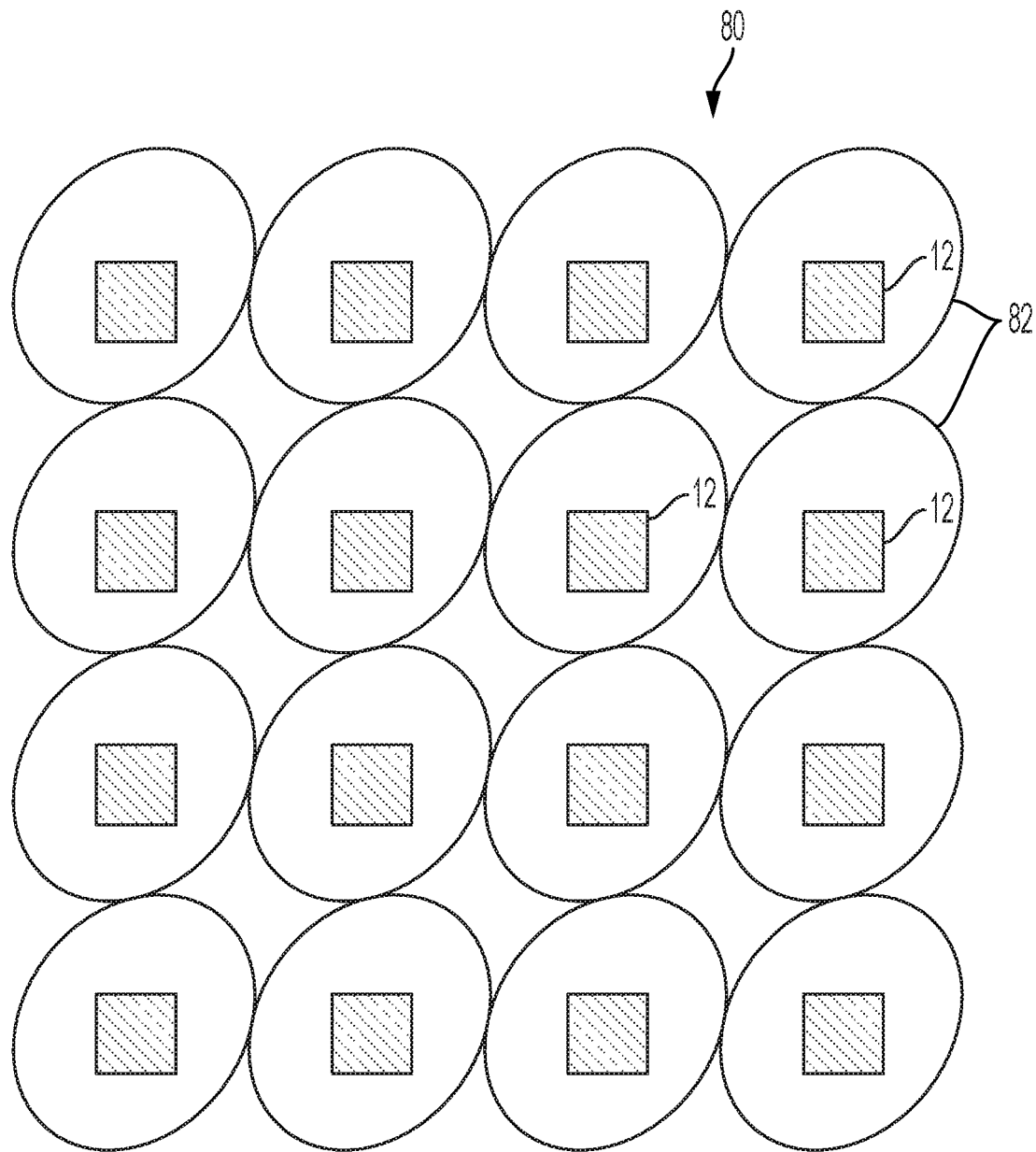
FIG. 8 shows a group of light emitters with a shaped diffuser structure with non-linear pixelated gaps according to one example.

FIG. 8 shows a plan view of an alternate LED array arrangement 80 with irregularly shaped diffusive capped features 82. This type of randomization can help to reduce the amount of readily visible patterning.

FIG. 9 shows a plan view with fabrication details for an emissive panel 90. Over the light sources 12 can be placed strips 72 and 73 of film shown as columns that provide alternating polarization or light retardation. Diffusive element 26 is provided on top of strips 72 and 73.

FIG. 10 shows an arrangement using irregularly spaced light sources 12 for improved randomization in a light emitting array 100.

FIG. 18A shows two light sources 212, 213, representing an array of sources of light to emit light for image pixels, mounted on a substrate 216. Each of the light source 212, 213 can have an optical element 209, 210 positioned on top to direct light to a corresponding diffuser element 220, 221. Each diffuser element 220, 221 can be positioned in front of a corresponding light source 212, 213 in the array. The optical element 209, 210, which can be a lens, a conical reflector (e.g., FIG. 5), or a combination thereof, can be integrated with the light source 212, 213, or the optical element 209, 210 can be separate and positioned between the light source 212, 213 and the diffuser element 220, 221. The centroid of brightness of the light from the light source 212, 213 on the diffuser element 220, 221 is indicated by where the dashed line from the light source reaches the diffuser 245, 250. The physical center axis of the diffuser element 220 is indicated by centerline 235 and the physical center axis of diffuser 221 is indicated by centerline 240. The physical center axes of the light source 212, 213 is indicated by centerlines 225, 230.

Each diffuser element 220, 221 can be one image pixel and each diffuser element 220, 221 can have a corresponding light source 212, 213. A matrix or array of light sources 212, 213 can be positioned on a substrate in a uniform grid pattern, but the diffusers 220, 221 positioned in front of the light sources 212, 213 can be randomly positioned over the light sources 212, 213. For example, the centerline 225 of the light source 212 can be in a different position than the centerline 235 of the corresponding diffuser 220. The light from the light sources 212, 213 can be distributed evenly over the surface of the diffuser element 220, 221 so the diffuser surface emits uniform light such that the center of brightness of light from the diffuser element corresponds to the physical centerline 235, 240 of the diffuser element 220, 221, as shown in FIG. 18B. Or the light from the light source can be directed to the diffuser surface by an optical element 209, 210 such that the centroid of the brightness of light emitted by the diffuser element 220, 221 is in a different position than the position of the physical centerline 235, 240 of the diffuser element 220, 221 because the centroid of brightness of light from the light source (line 224 and line 226) intersect the corresponding diffuser surface at a location that is different than physical centerline 235, 240 of the diffuser 220, 221, as shown in FIG. 18A. The structures of FIGS. 18A-B can create a display of image pixels that are random spatially. In some examples, the array of sources of light is a grid array.

The image pixels over an image area can be achieved in a number of ways. One way is to have the physical centerlines of the diffuser elements randomly positioned over the grid array of light sources. Another is to have the centroids of brightness of emitted light from the diffuser elements randomly positioned over the grid array of light sources. Both the physical centerlines of the diffuser elements and the centroids of brightness of emitted light from the diffuser can be randomly positioned over the grid array. The diffuser elements can have random shapes to create a random look or have random sizes to create a random look or a combination of. These examples of creating a random image pixel look can be implemented while keeping the light sources in a grid array pattern in a uniform pattern.

The spatial random look of image pixels can also be achieved by randomizing the physical position of the centerline of the light sources over an image area. Further randomization of image pixels can be achieved by combining the randomization of light source centerlines over an image area with randomizing the centerline of the diffuser elements over an area or with the randomization with brightness centroid positions of emitted light from the diffuser elements over an area or a combination of. Further randomization of image pixels can be achieved by combining the randomization of light source centerlines over an image area with randomized diffuser element shapes or sizes or a combination of.

High Power Light Emitting Displays for Projection

One approach that can optimize the use of direct display can involve the use of micro-LEDs. With the advent of very high brightness addressable micro-LEDs that can deliver on the order of 10-100 W/cm$^2$ and up to 40-300 W/cm$^2$ per color, it becomes possible to create a reasonably sized panel that is larger than typical micro-display devices (which are approximately 1 inch diagonal) that can reasonably light up a very large projection screen. An addressable micro-LED array can be used as both the light source and the modulator, obviating the need for a separate modulator array (e.g., a DMD). For example, a 6 inch wafer can theoretically accommodate a 2:1 aspect ratio display of 13.61 by 6.81 cm or a 92.3 cm$^2$ area. Such a device can deliver over 300-9000 watts of single color light, which can be over a factor of 10 higher than laser projectors. So even a much smaller micro-LED display can be used to deliver a substantially brighter hybrid direct emission projection experience than the brightest laser projectors available today. A highly thermally conductive substrate can be used to manage the electrical to thermal energy losses. This can be completed by a sapphire, diamond or even metal substrate, if the electronics can be made compatible with such materials. Highly efficient liquid cooling may also be used to accomplish proper cooling.

Figure 16:
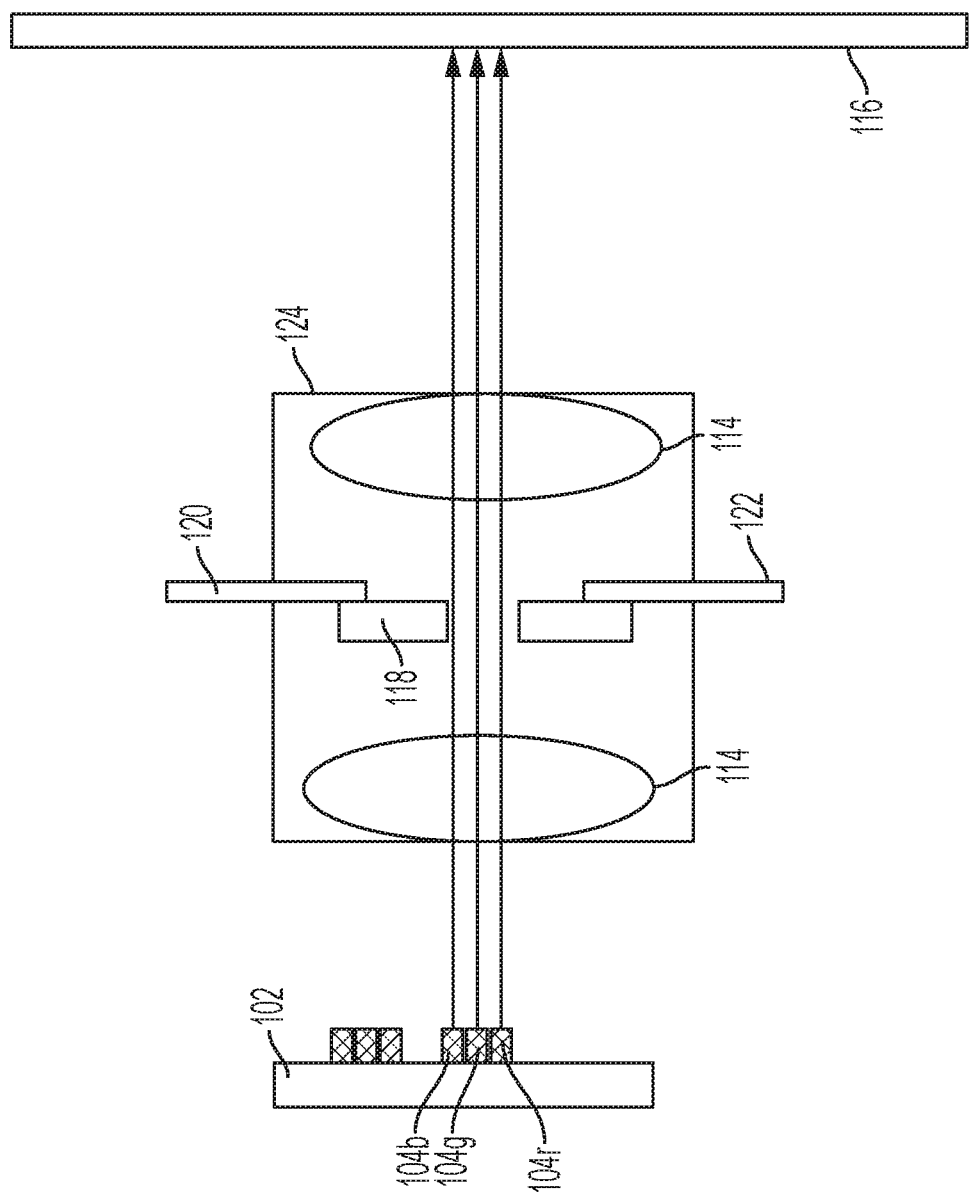
FIG. 16 shows a three-color pixel hybrid direct emitter projector according to one example.
Figure 17:
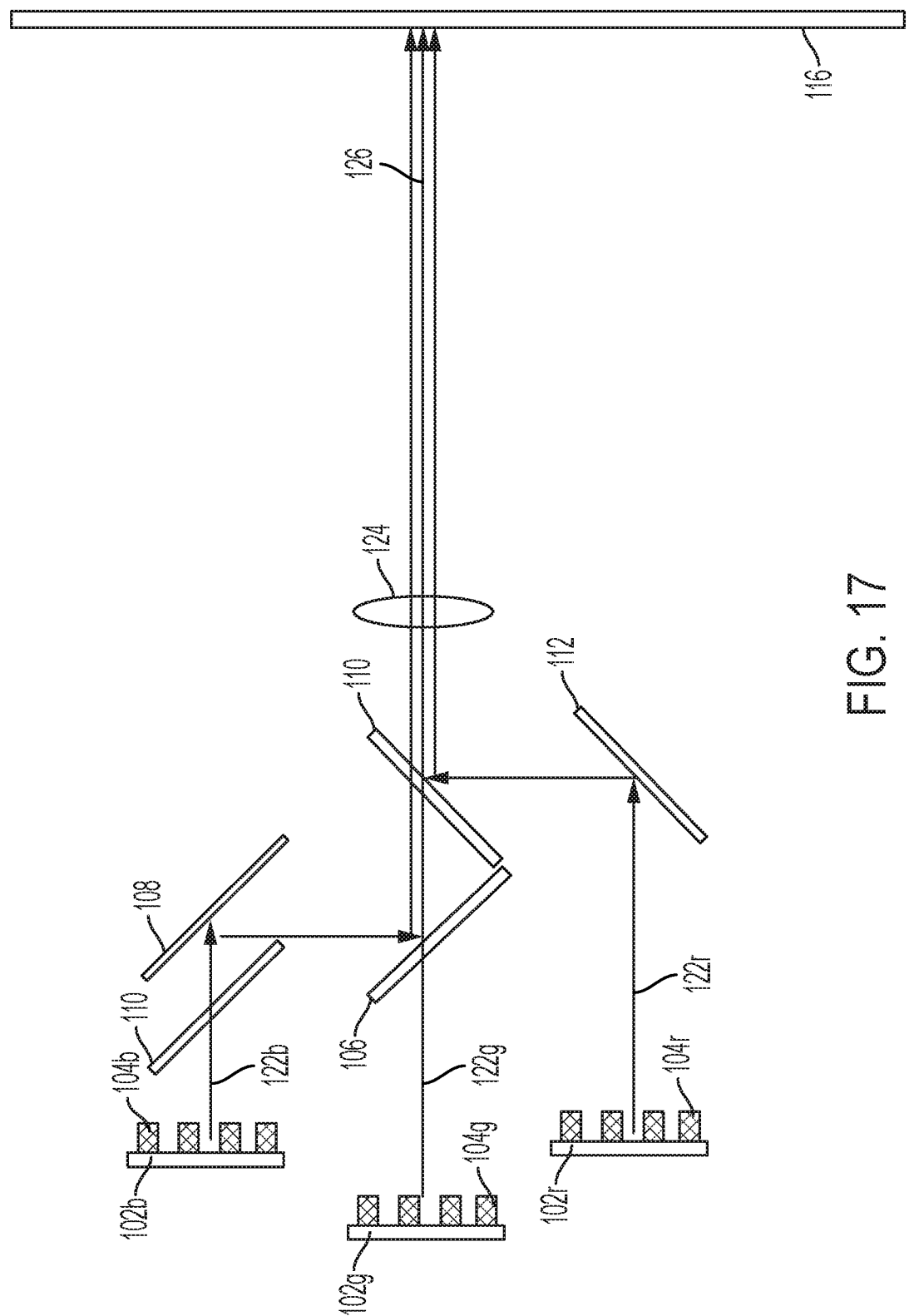
FIG. 17 shows a three direct emission display panels combined into a hybrid direct emitter projector according to one example.

It can be useful to equip the light emitters of the addressable micro-LED array with various configurations of micro-optics (not shown), including reflectors, lenses, and diffusers, to provide local beam shaping. For example, the LED emitters and associated micro-optics can combine to produce collimated or quasi-collimated optical beams with divergences of ≤±15°. However, when used in a projection system, use of a complex micro-optical structure for each light emitting pixel can increase cost, generate stray light, and create visual artifacts. Thus, it can be useful to moderate the use of the micro-optics, resulting in a reduced light efficiency from the projector, in exchange for an improved projected image quality. To some extent, the resulting light inefficiency can be offset by the fact that the overall optical system can be much simpler than conventional systems, where instead, light from lasers or lamps is shaped and directed onto a set of modulator arrays (e.g., DMDs). The projection systems in which the source light is the image light may not have an illumination optical system and may not suffer from light loss or inefficiencies of an illumination systems. FIGS. 16, 17, and 19 illustrate a projection system in which the source of light is the image light.

In one example, shown in FIG. 16, a projector can include three differing light emitters: red 104r, green 104g, and blue 104b emitters. The emitters can provide addressable image pixels on an addressable display panel 102. The image pixels and the display panel 102 can be addressable by each emitter (or light source such as an LED) included in the display panel 102 can be individually controlled, separate from other emitters of the display panel 102 such that each pixel provided by the emitter can be individually controlled. The addressable display panel 102 can have an array of light emitting sources that can emit pixels of light. The array of light emitting sources can be an array of pixels of light that provides an image and the image can be projected by a lens 124. This can simplify the projection optics, which may involve only the lens 124 to image or magnify the display to a distant screen 116. Lens 124 is represented as a refractive lens with two lens elements 114 clustered about an aperture stop 118. In other examples, the lens 124 can include numerous lens elements (e.g., 8-20) fabricated using a selection of glass types. Lens elements 114 can represent single lens elements, or multiple lens elements, including cemented or air spaced doublets or triplets. Lens 124 can be a projection lens that images an addressable LED display panel 102, and that can have common RGB focal planes that overlap the three-color emitters 104. Lens 124 can instead also image an effective surface or effective pixel plane that is located in proximity to an addressable LED display panel 102 and that is created by the associated micro-optics. The lens 124 can be varifocal to enable at least one time adjustment of the magnification to suite the desired size of the screen 116, or a zoom lens.

As shown in FIGS. 3A and 4A, light emerging from a light source 12 or emitter 42, respectively, or an image pixel, can diverge to provide a symmetrical or asymmetrical cone angle of emergent light that fills a substantial angle, up to being a Lambertian source (±90° emission angles.) Adding micro-optics can decrease the apparent divergence, by redirecting the emitted light, some portion of which can then be collected by the imaging optics. For example, increasing the F #, to provide slower collection than a conventional projection lens at F #2.4 (±12° cone), such as F #4.0 (±7°) or even higher (e.g., F/7, (±4°)), can substantially reduce the light collection capacity or efficiency, while also reducing the system stray light and improve the intra-frame (e.g., ANSI) contrast ratios. Furthermore, slowing the lens down can increase the depth of focus and make the system more insensitive to thermal lensing. Under these circumstances, with direct LED array modulators equipped with beam-shaping micro-optics, the emission angles from the light emitters, with their associated micro-optics, can be much larger (e.g., ±20°-50°) than the capture angle or allowable cone angle of acceptance of the imaging optics or projection lens (e.g., ±4°-±12°), and a substantial portion (e.g., ≥15%, and maybe as much as 50-90%) of the available image light in an emergent cone from a given image pixel may not be captured, such that it does not successfully arrive at the distant screen. In such a case, for example, the aperture stop 118 can get very hot absorbing the excess light. This can be detrimental to the lens performance as heating can degrade both the image quality and the polarization maintenance provided by the lens.

To address this, the aperture stop 118 can be positioned as an open-air stop that can be air or water cooled. Aperture stop 118 can be a plate with an aperture in it. The image light that arrives at the screen passes through this hole or aperture, while other light, which can include both stray light and potential image light is blocked by a plate or beam block structure. This hole or aperture can be circular or have a more complex shape. For example, FIG. 16 shows a water cooled aperture stop incorporated into a standard lens design, with a liquid inlet 120 and outlet 122 positioned externally to the lens to circulate water around the aperture stop and cool the light blocking plate. This cooling loop can be added in series or parallel to existing projection cooling loops. As an alternative, the projection lens system can be used in combination with a relay optical system which has the open-air aperture stop. This relay can be a refractive lens system, a catoptric imaging system (using all mirrors, e.g., an Offner), or a catadioptric imaging system, which re-images a LED display panel 102 to an intermediate image, which is re-imaged to the screen by a projection lens 124. Because a relay system typically has a modest magnification (e.g., 1:1 or 2:1), it can be easier to provide unencumbered space to position the aperture stop in, as compared to doing so within a high magnification projection lens. For example, in an Offner relay (not shown), the aperture stop is at or near the secondary mirror, and it can be readily cooled, and the image quality is dictated by mirror position instead of by a heated lens element that can change shape and therefore impact wavefront quality. While in typical projectors adding cooling to an aperture stop can a very large change, in very high lumen projectors, the display devices and emitters are already often water cooled. So, this can be a relatively simple addition to such a projector.

One example of a projection system, shown in FIG. 17, contains three different emitter panels 102r,g,b, each of a single emitter 104r,g,b primary wavelength band color combined into a hybrid direct emission projector. The different emitter panels can be separate arrays of light emitting light sources. Each array can be an array of pixels of light that is a separate image. This can enable the emitter(s) 104 to potentially remain in place on its fabricated substrate, removing the need for pick and place processes to create a three-color emitter panel 102. Further, as the emitters are made on the same wafer, their behavior can be more similar, thus involving less calibration. Regardless, emitter redundancy can be useful so that individual failed emitters do not cause entire emitter panels to be replaced or scrapped. The optical system for three emitters can be implemented in multiple methods. Because of the light levels desired, optical elements of fused silica and other low absorption optical glasses (e.g., SFPL53, F2 and SF1) can be used to reduce optical heating and the associated thermally induced birefringence and wavefront degradations that will degrade the performance. Prisms dichroic combiners may be used, but absorption and thermal implications of adhesives can become a limiting factor at very high light loads. Optical contacting and chemically assisted optical contacting can be considered if the components remain small enough to keep this practical. Plate beamsplitters 106, 108, 110 and mirror 112, as shown in FIG. 17, may also be optical combiners that can combine colored image light along a common optical path 126 that includes lens 124. The beamsplitters 106, 108, 110 and mirror 112 can be positioned between the separate arrays of light emitting light sources (i.e., emitter panels 102r,g,b) and the projection lens, represented by lens 124. The beamsplitters 106, 108, 110 and mirror 112 can combine the additional separate images to form a single image that is projected by the projection lens, represented by lens 124.

In this example, the green optical path 122g is selected such that the light from emitters 104g transmit through opposingly tilted beamsplitters 106, 110 to substantially compensate out astigmatic aberrations. The red light provided by red emitters 102r transits along a red optical path 122r having two reflections on dichroic beamsplitters 110 and mirror 112. In this case, the surfaces of the beamsplitters can be controlled to not impart significant image degradation. Finally, blue has both astigmatic compensation at both beamsplitter plates 110 and two reflections along blue optical path 122b at dichroic beamsplitters 106 and 108. As blue resolution is least noticeable, degradations from these surfaces may be least important. Note that the center pixels can overlap at screen 116 when projected through lens 124. As in earlier examples, lens 124 may be a varifocal lens with an aperture that substantially eliminates high-angle light to improve contrast.

FIG. 19 depicts a more detailed version of the projection system of FIG. 17, in which a refractive relay lens, which includes lens elements 132a-b, is provided along the common optical path 126. The refractive relay lens directs image light through an aperture stop 118 and it creates an intermediate image 140, which in turn is projected to the distant screen 116 by a lens 124. This system further includes an arrangement of baffles 150 in proximity to the addressable LED panels 102r,g,b and in proximity to the first relay lens element 132a. The addressable LED panels 102r,g,b can include RGB LED emitters as an array of light emitting sources. For example, LED panel 102r can include red LED emitters, LED panel 102g can include green LED emitters, and LED panel 102b can include blue LED emitters. The baffles 150, which can be air or water cooled and include heat sinks or fins, can capture or absorb high angle or stray light emitted by the panels 102 at divergence angles that exceed the collection angles or allowable cone angle of acceptance of light supported by the imaging optics, so as to both help improve image contrast and reduce the burden on the aperture stop 118. In some examples, the system may include a cooling system for the aperture stop 118, such as a system similar to that shown in FIG. 16. When emitted light exceeds that within the allowable cone angle of acceptance of light of the imaging optics (e.g., projection lens 124) and light loses exceed 15%, then other components, such as baffles 150 and the aperture stop 118, can be used to absorb and block the excess light, respectively. For example, the baffles 150 and aperture stop 118 can block at least 15% of the image light from the addressable LED panels 102r,g,b. Alternatively, if the light absorbed by the aperture stop 118 exceeds an equivalent to 30 watts above absorption of stray light within the acceptance cone, then baffles 150 can be applied to reduce thermal loads within the imaging optics. If the angular extent or width of the light emission varies with color, than the optimization of the baffle designs can also vary by color. For example, one or more baffles 150 can block light from light sources of a particular color LED panel—red LED color panel 102r, green LED color panel 102g, or blue LED color panel 102b—and allow light from the other two panels to pass. The system in FIG. 19 may also include optical combiners, such as those shown in FIG. 17, to combine colored image light.

EXAMPLES

Example 1 is a projection system comprising: a projection lens having an aperture stop and a baffle; and at least one array of light emitting sources configured to emit image light having a cone angle exceeding an allowable cone angle of acceptance of light of the projection lens, from an arrangement of addressable image pixels, wherein the projection lens is positioned to receive the image light from the addressable image pixels and direct the image light toward a screen, wherein the aperture stop and the baffle are configured to block a portion of the image light that exceeds the allowable cone angle of acceptance of light of the projection lens.

Example 2 is the projection system of example 1, wherein the aperture stop and the baffle are configured to be cooled by a cooling system.

Example 3 is the projection system of example 1, wherein the at least one array of light emitting sources includes RGB LED emitters.

Example 4 is the projection system of example 3, wherein the at least one array of light emitting sources includes a first panel with red LED emitters, a second panel with green LED emitters, and a third panel with blue LED emitters.

Example 5 is the projection system of example 4, wherein the baffle is configured to block light from the first panel, the second panel, or the third panel and allow light to pass from the other two panels of the first panel, the second panel, or the third panel.

Example 6 is the projection system of example 3, further comprising one or more optical combiners configured to combine image light from the RGB LED emitters.

Example 7 is the projection system of example 6, wherein the one or more optical combiners comprises a plurality of beamsplitters and a mirror positioned between the RGB LED emitters and the projection lens.

Example 8 is the projection system of example 7, wherein the plurality of beamsplitters and the mirror are configured to combine separate images from the RGB LED emitters to form a single image for being directed toward the screen by the projection lens.

Example 9 is the projection system of example 1, further comprising a refractive relay lens configured to create an intermediate image for being directed by the projection lens toward the screen.

Example 10 is the projection system of example 1, wherein the baffle and the aperture stop are configured to block at least 15% of the image light provided by the at least one array of light emitting sources.

Example 11 is the projection system of example 1, wherein the projection system does not include a separate modulator.

Example 12 is a display system comprising; an array of sources of light positioned on a display, each source of light in the array being configured to emit light for an image pixel and to have a center axis; and a plurality of diffuser elements, each diffuser element of the plurality of diffuser elements having a diffuser center axis and being positioned in front of a corresponding source of light in the array; wherein the sources of light of the array are positioned uniformly in the array that is a grid array and each diffuser element of the plurality of diffuser elements is positioned such that the diffuser center axis of a respective diffuser element is spaced randomly with respect to the center axis of the corresponding source of light to display image pixels that are random spatially.

Example 13 is the display system of example 12, further comprising a plurality of optical elements, each optical element of the plurality of optical elements being positioned between each diffuser element and the source of light corresponding to the diffuser element, each optical element being configured for modifying the light from the source of light to produce a light distribution on the diffuser element that has a brightness of light centroid that is in a different position on the diffuser element than the center axis of the diffuser element.

Example 14 is the display system of example 12, wherein the plurality of diffuser elements has shaped surface areas that are random in shape across the array of sources of light to create the display of image pixels that are random in shape.

Example 15 is the display system of example 12, wherein the plurality of diffuser elements has shaped surface areas that are the same shape and that have sizes that are random.

Example 16 is the display system of example 12, wherein the plurality of diffuser elements has shaped surface areas that are the same shape and that define gaps between the shaped surface areas that are differently sized across the array.

Example 17 is a display system comprising; an array of sources of light on a display, each source of light in the array being configured to emit light for an image pixel and to have a center axis; a plurality of diffuser elements, each diffuser element of the plurality of diffuser elements having a diffuser center axis and being positioned in front of a corresponding source of light in the array; and a plurality of optical elements, each optical element being positioned between each diffuser element and the source of light corresponding to the diffuser element; wherein the sources of light of the array are positioned uniformly in the array that is a grid array and each diffuser element of the plurality of diffuser elements is positioned such that the diffuser center axis is spatially aligned with the center axis of the corresponding source of light, wherein each optical element of the plurality of optical elements is configured for modifying the light from the corresponding source of light to produce a light distribution on the diffuser element with a brightness of light centroid that is in a different position than the diffuser center axis, different positions of the brightness of light centroid in the array being random to display image pixels with spatially random brightness of light positions over the array.

Example 18 is the display system of example 17, wherein the plurality of diffuser elements has shaped surface areas that are random in shape across the array of sources of light.

Example 19 is the display system of example 17, wherein the plurality of diffuser elements has shaped surface areas that are the same shape and that have sizes that are random.

Example 20 is the display system of example 17, wherein the plurality of diffuser elements has shaped surface areas that are the same shape and that define gaps between the shaped surface areas that are differently sized across the array.

Example 21 is an emissive panel for display comprising: an array of light sources arranged in rows and columns that are perpendicular to the rows; a first array of polarizers overlaid on a portion of the light sources and configured for transmitting light of a first polarization state; a second array of polarizers overlaid on an alternate portion of the light sources to transmit light of a second polarization state that is orthogonal to the first polarization state; and an overlaid layer configured to spread transmitted light to cause the light sources to be non-uniform in size and shape.

Example 22 is the emissive panel of example 21 where the overlaid layer is a diffuser.

Example 23 is the emissive panel of example 21 is a lens or lenslets.

Example 24 is the emissive panel of example 21 wherein the first polarization state and the second polarization states are orthogonal circular polarization states.

Example 25 is the emissive panel of example 21 wherein the first polarization state and the second polarization states are orthogonal linear polarization states.

Example 26 is the emissive panel of example 21 wherein the polarizers comprise individual capped elements that are rotatable to adjust the polarization state.

Example 27 is the emissive panel of example 21 wherein the polarizers are sheet polarizers arranged to cover alternating rows or columns of the array of light sources.

Example 28 is the emissive panel of example 21 further comprising a plurality of audio ports integral to the panel.

Example 29 is the emissive panel of example 21 wherein the diffusers are individual elements of randomized shapes.

Example 30 is the emissive panel of example 21 further comprising one or more quarter-wave plates.

Example 31 is the emissive panel of example 21 wherein the light sources are light-emitting diodes.

Example 32 is the emissive panel of example 21 wherein the light sources are quantum dots.

Example 33 is the emissive panel of example 21 wherein the light sources are organic light emitters.

Example 34 is the emissive panel of example 21 wherein the panel is configured to form a stereoscopic display with the first polarization state for a left-eye image and the second polarization state for a right-eye image.

Example 35 is the emissive panel of example 21 wherein the panel forms a stereoscopic display with a first set of primary wavelengths for a left-eye image and a second set of primary wavelengths for a right-eye image.

Example 36 is a method of displaying images in a cinema, the method comprising: providing an array of light sources arranged in rows and columns perpendicular to the rows, the array of light sources having (i) a first array of polarizers overlaid on a portion of the light sources and transmitting light of a first polarization state and (ii) a second array of polarizers, overlaid on an alternate portion of the light sources to transmit light of a second polarization state that is orthogonal to the first polarization state; and energizing the array of light sources to simultaneously form a left-eye image and a right-eye image of the first polarization state and the second polarization state, respectively.

Example 37 is the method of example 36 in which the array or polarizers includes: a crystalline optical structure; film base retarders; diffractive optical elements; photonic structures; dielectric or metallic thin film optical coating; meta-material or plasmonic structures; or waveguide structures.

Example 38: The method of example 36 further comprising reducing pixelization from non-emissive areas between the light sources by adding: a diffuser; a lens; or lenslet arrays or pairs of lenslet arrays.

Example 39: A method of displaying images in a cinema, the method comprising: providing an array of light sources arranged in rows and in columns that are perpendicular to the rows, where one portion of the light sources transmit light of a first polarization state and an alternate portion of the light sources transmit a light of a second polarization that is orthogonal to the first polarizing state, a light source in the array of light sources being capable of generating both the first polarization state of light and the second polarization state of light and only generating either the first state of polarization of light or the second polarization state; and energizing the array of light sources to temporally alternate the state of polarization between the first polarization state and the second polarization state to form a first eye image and a second eye image with the first and second polarization states respectively.

Example 40: The method of example 39 in which the first eye image and the second eye image form a stereoscopic image.

Example 41: The method of example 39 where energizing the array of light sources further comprises controlling the polarization state of light generated by changing a signal's polarity across the light source.

Example 42: The method of example 39 where energizing the array of light sources further comprises controlling the polarization state of light generated by changing the direction of current through the light source.

Example 43 is a method of displaying images in a cinema, the method comprising: providing an array of light sources arranged in rows and columns perpendicular to the rows, the array of light sources having a first array of polarizers overlaid on one portion of the light sources that transmit light of a first polarization state and (ii) a second array of polarizers overlaid on an alternate portion of the light sources that transmit light of a second polarization state that is orthogonal to the first polarization state; and energizing the array of light sources to simultaneously form a first image sequence of the first polarization state and a second image sequence of the second polarization state, wherein the first image sequence is a first motion picture and the second image sequence is a different motion picture.

Example 44 is the method of example 43, wherein the first image sequence is viewable by viewers via a first pair of polarized eyeglasses and the second image sequence is viewable by viewers via a second pair of polarized eyeglasses.

Example 45. A method of displaying images in a cinema, the method comprising: providing an array of light sources arranged in rows and columns perpendicular to the rows where one portion of the light sources transmit light of a shorter wavelength than an alternate portion of the light sources, and the alternate portion of the light sources transmit light with a longer wavelength than the one portion of the light sources; and energizing the array of light sources simultaneously to form a first eye image and a second eye image with the shorter wavelength and the longer wavelength, respectively.

Example 46. The method of example 45 in which the first eye image and the second eye image form a stereoscopic image.

Example 47. The method of example 45 further comprising adjusting the wavelength is by at least one of; selecting light sources by a binning process; pulse width modulation; spectrally controlling the wavelength by spectral filters; tuning material properties; tuning photonic crystals; controlling a size of the emitter; controlling meta-material design of the light sources; tuning by controlling the light sources thermally; tuning the light sources using optical elements; tuning by controlling the light sources electrically; or tuning by controlling the light sources magnetically.

Example 48 is a display system comprising; an emitter configured for emitting unpolarized light; a substrate on which the emitter is mounted; and a polarizer element positioned to receive the unpolarized light, the polarizer element being configured to transmit a first polarization state of light and reflect a second polarization state of light towards the emitter and the substrate, the second polarization state being orthogonal to the first polarization state, where the substrate is configured to reflect the reflected second polarization state of light toward the polarizer, the substrate surface being configured to reflect and modify the reflected second polarization state of light back towards the polarizer element with a polarization state of light that the polarizer is configured to transmit to increase the brightness of the display for a viewer of the display.

Example 49 is the display of example 48 where the first polarization state or the second polarization state is a linear or circular polarization.

Example 50 is the display system of example 49, further comprising a first polarizer element configured to transmit the first polarization state of light and a second polarizer element configured to transmit the second polarization state of light.

Example 51 is the display system of example 50, wherein the display system is a stereoscopic display configured to transmit the first state of polarization of light that is light for a right-eye image and to transmit the second state of polarization of light that is light for a left-eye image.

Example 52 is the display system of 51 further comprising a controller for controlling the emitters configured to produce right-eye image light separately from the emitters that produce left-eye image light.

Example 53. A display system comprising: a first panel with a first array of light emitters and a first surface between the light emitters; and a second panel with a second array of light emitters and a second surface between the light emitters, where the first panel is positioned adjacent to the second panel such that an edge of the first panel adjacent to an edge of the second panel is joined so that the first surface at the edge of the first panel is coplanar with the second surface at the edge of the second panel.

Example 54. The display system of example 53 where the first panel has a flexible surface.

Example 55. The display of example 53 where the display has an image area that is curved surface.

Example 56. The display of example 55 where the first panel is a polygon shape.

Example 57. A display system comprising a panel with an array of light emitters and a surface between the light emitters, where the surface is configured to prevent light incident on the panel from being reflected out using: a hole; a baffle; a pocket; or a relief.

Example 58. A display system of example 57, wherein the space between centers of adjacent light emitters is less than or equal to the resolution of a human eye positioned in the seat closest to the display.

Example 59. A display system of example 57, further comprising a plurality of panels to form an image area in which the emitter brightness is adjusted from the center of the display to the edge of the display.

Example 60. A display system of 59, wherein a brightness profile at the edge of the display is configured to be a fixed percentage of the brightness at the center of the display.

Example 61. A theatre comprising a light emitting display in which light from angles beyond what is viewed directly from a viewer positioned in front of the light emitting display is configured to be captured by surface elements in the theatre such that two reflection bounces are configured to occur before light reaches the viewer.

Example 62. A theatre comprising a light emitting display in which an optical structure is positioned in front of the light emitting display to control light to an audience, wherein the optical structure is: an optical film structure; a lens structure; or a diffractive structure.

Example 63. A light emitting display comprising: a first light emitter in an array of light emitters, the first light emitter being configured to have a first light dispersion angle; and a second light emitter in the array of light emitters, the second light emitter being configure to have a second light dispersion angle, wherein the first light emitter and the second light emitter are positioned to direct more light to a viewer as compared to light emitters with the same dispersion angle.

Example 64. The light emitting display of example 63 where the first light dispersion is a first horizontal light dispersion and the second light dispersion is a second horizontal dispersion.

Example 65. A light emitting display comprising: a light source configured to emit light with a first spectral bandwidth; and an optical element configured to limit a spectral bandwidth of light, wherein the optical element is positioned to receive the first bandwidth of light and output a second bandwidth of light, the second bandwidth being less than the first bandwidth.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A projection system comprising:
a projection lens having an aperture stop and a baffle; and
at least one array of light emitting sources configured to emit image light having a first etendue that is larger than the projection lens to increase an image contrast of the image light, the light emitting sources comprising at least one light source that is an image pixel and that is controllable as an individually addressable image pixel,
wherein the projection lens is positioned to receive the image light from the at least one array of light emitting sources and direct the image light toward a screen,
wherein the aperture stop and the baffle are configured to block at least 15% of the image light in an emitted light path from the light emitting sources by reducing the first etendue of the image light to a second etendue that is smaller than the first etendue and is receivable by the projection lens.

2. The projection system of claim 1, wherein the aperture stop and the baffle are configured to be cooled by a cooling system.

3. The projection system of claim 1, wherein the at least one array of light emitting sources includes RGB LED emitters.

4. The projection system of claim 3, wherein the at least one array of light emitting sources includes a first panel with red LED emitters, a second panel with green LED emitters, and a third panel with blue LED emitters.

5. The projection system of claim 4, wherein the baffle is configured to block light from the first panel, the second panel, or the third panel and allow light to pass from the other two panels of the first panel, the second panel, or the third panel.

6. The projection system of claim 3, further comprising one or more optical combiners configured to combine image light from the RGB LED emitters.

7. The projection system of claim 6, wherein the one or more optical combiners comprises a plurality of beamsplitters and a mirror positioned between the RGB LED emitters and the projection lens.

8. The projection system of claim 7, wherein the plurality of beamsplitters and the mirror are configured to combine separate images from the RGB LED emitters to form a single image for being directed toward the screen by the projection lens.

9. The projection system of claim 1, further comprising a refractive relay lens configured to create an intermediate image for being directed by the projection lens toward the screen.

10. The projection system of claim 1, wherein the projection system does not include a separate modulator.

11. The projection system of claim 1, wherein the projection lens is configured to image an effective pixel plane that is in proximity to the at least one array of light emitting sources.

12. The projection system of claim 1, wherein the aperture stop and the baffle are configured to block a portion of the image light that exceeds an allowable cone angle of acceptance of light of the projection lens by at least 20°.

* * * * *